(12) United States Patent
Bloom

(10) Patent No.: US 7,827,094 B2
(45) Date of Patent: Nov. 2, 2010

(54) TRADING OF DERIVATIVE SECURED INDEX PARTICIPATION NOTES

(75) Inventor: Steven M. Bloom, Springfield, NJ (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 174 days.

(21) Appl. No.: 11/553,549

(22) Filed: Oct. 27, 2006

(65) Prior Publication Data

US 2008/0065560 A1 Mar. 13, 2008

Related U.S. Application Data

(60) Provisional application No. 60/794,481, filed on Apr. 24, 2006.

(51) Int. Cl.
*G06Q 40/00* (2006.01)

(52) U.S. Cl. .......................................... 705/37; 705/35

(58) Field of Classification Search ................... 705/35, 705/37
See application file for complete search history.

(56) References Cited

U.S. PATENT DOCUMENTS

| | | | |
|---|---|---|---|
| 5,819,238 A | 10/1998 | Fernholz | |
| 6,125,363 A | 9/2000 | Buzzeo et al. | |
| 6,879,964 B2 | 4/2005 | Sauter et al. | |
| 6,941,280 B1 | 9/2005 | Gastineau et al. | |
| 7,062,459 B1 | 6/2006 | Herbst et al. | |
| 7,085,738 B2 | 8/2006 | Tarrant | |
| 7,089,201 B1 | 8/2006 | Dellinger et al. | |
| 7,099,838 B1 | 8/2006 | Gastineau et al. | |
| 7,124,105 B2 | 10/2006 | Hilton | |
| 7,212,993 B1 | 5/2007 | Bodurtha et al. | 705/35 |
| 7,212,997 B1 | 5/2007 | Pine et al | 705/36 R |
| 7,249,077 B2 | 7/2007 | Williams et al. | |
| 7,283,978 B2 | 10/2007 | Frankel et al. | 705/35 |
| 7,310,616 B2 | 12/2007 | Sugahara | 705/37 |
| 7,319,984 B2 | 1/2008 | Frankel et al. | 705/35 |
| 7,373,320 B1 | 5/2008 | McDonough | 705/35 |
| 7,389,262 B1* | 6/2008 | Lange | 705/37 |
| 7,398,243 B1 | 7/2008 | Ocampo | 705/36 R |
| 7,418,417 B2 | 8/2008 | Chacko et al. | 705/36 |
| 2001/0025266 A1 | 9/2001 | Gastineau et al. | |
| 2002/0046154 A1 | 4/2002 | Pritchard | 705/37 |
| 2002/0091616 A1 | 7/2002 | Bloom et al. | |
| 2002/0128947 A1 | 9/2002 | Sauter et al. | |
| 2002/0161684 A1 | 10/2002 | Whitworth | |
| 2002/0194099 A1 | 12/2002 | Weiss | 705/36 |
| 2003/0018570 A1 | 1/2003 | McCabe et al. | 705/37 |

(Continued)

FOREIGN PATENT DOCUMENTS

WO WO2004/034196 4/2004

OTHER PUBLICATIONS

Scott Barie, "The Complete Idiot's Guide to Options and Futures," 2001, Alpha Books, pp. 120-121.*

(Continued)

*Primary Examiner*—Jagdish N Patel
*Assistant Examiner*—Kenneth Bartley
(74) *Attorney, Agent, or Firm*—Fish & Richardson P.C.

(57) ABSTRACT

Techniques are described for securitizing, administrating and trading various index shares securitized by derivative, cash-settled instruments on the underlying index.

16 Claims, 33 Drawing Sheets

U.S. PATENT DOCUMENTS

| | | | |
|---|---|---|---|
| 2003/0033232 A1 | 2/2003 | Sugahara | 705/36 |
| 2003/0093356 A1* | 5/2003 | Kaufman | 705/37 |
| 2003/0115128 A1 | 6/2003 | Lange et al. | |
| 2003/0120568 A1 | 6/2003 | Chacko et al. | 705/35 |
| 2003/0172026 A1 | 9/2003 | Tarrant | |
| 2003/0225657 A1 | 12/2003 | Whaley et al. | |
| 2003/0225658 A1 | 12/2003 | Whaley et al. | |
| 2004/0044609 A1 | 3/2004 | Moore | |
| 2004/0049448 A1 | 3/2004 | Glickman | |
| 2004/0177022 A1 | 9/2004 | Williams et al. | |
| 2004/0186803 A1 | 9/2004 | Weber et al. | |
| 2004/0215538 A1 | 10/2004 | Smith et al. | |
| 2004/0254871 A1 | 12/2004 | Weiss | |
| 2005/0038726 A1 | 2/2005 | Salomon et al. | |
| 2005/0049952 A1 | 3/2005 | Carter | |
| 2005/0102214 A1 | 5/2005 | Speth et al. | |
| 2005/0108146 A1 | 5/2005 | Bond | |
| 2005/0119962 A1* | 6/2005 | Bowen et al. | 705/37 |
| 2005/0131789 A1* | 6/2005 | Mintz | 705/35 |
| 2005/0144107 A1 | 6/2005 | Plonski | |
| 2005/0160024 A1 | 7/2005 | Soderborg et al. | 705/37 |
| 2005/0209947 A1 | 9/2005 | Shafer | 705/36 |
| 2005/0246197 A1 | 11/2005 | Shepherd | 705/1 |
| 2005/0262010 A1 | 11/2005 | Tull, Jr. et al. | |
| 2006/0015433 A1 | 1/2006 | Arnott et al. | |
| 2006/0080208 A1 | 4/2006 | Harrison | 705/37 |
| 2006/0100949 A1 | 5/2006 | Whaley et al. | |
| 2006/0100955 A1 | 5/2006 | Baldassini et al. | |
| 2006/0149645 A1 | 7/2006 | Wood | |
| 2006/0218075 A1 | 9/2006 | Feldman et al. | |
| 2006/0253376 A1 | 11/2006 | Seale et al. | |
| 2006/0265301 A1 | 11/2006 | Chorna et al. | 705/35 |
| 2006/0271461 A1 | 11/2006 | Chorna et al. | 705/35 |
| 2007/0011069 A1 | 1/2007 | Bevacqua, Jr. | 705/35 |
| 2007/0130041 A1 | 6/2007 | Strela et al. | 705/36 |
| 2007/0203855 A1 | 8/2007 | Fisher | 705/36 |

OTHER PUBLICATIONS

Jim Graham, "Put/Call Parity and Snythetic Positions," Oct. 12, 2003, OptionVue Research, pp. 1-3.*
Clifford Chance, "Securities and Exchange Commisson," Letter to SEC, Mar. 2005, p. 5 and 11.*
U.S. Appl. No. 11/553,521, filed Oct. 27, 2006, Steven M. Bloom.
U.S. Appl. No. 11/553,527, filed Oct. 27, 2006, Steven M. Bloom.
U.S. Appl. No. 11/553,548, filed Oct. 27, 2006, Steven M. Bloom.
U.S. Appl. No. 11/553,567, filed Oct. 27, 2006, Steven M. Bloom.
U.S. Appl. No. 11/553,550, filed Oct. 27, 2006, Steven M. Bloom.
U.S. Appl. No. 11/553,584, filed Oct. 27, 2006, Steven M. Bloom.
$500,000,000 Barclays Bank PLC,—IPath Exchange Traded Notes due Jun. 12, 2036 Linked to the GSCI Total Return Index- Medium Term Notes, Series A- Jun. 6, 2006.
Rubinstein, M., "Market Basket Alternatives", Financial Analysts Journal, Sep.-Oct. 1989, 16 pgs.
American Stock Exchange—original SEC filing for Equity Index Participations, File No. SR-Amex-88-10.
*Direxion Funds*, prospectus dated May 1, 2006 and supplemented May 11, 2006.
SEC approval order—Securities Exchange Act Releast No. 26709 (Apr. 11, 1989), 54 FR 15280.
U.S. Court of Appeals, 7$^{th}$ Cir., *Chicago Mercantile Exchange et al. v. Securities and Exchange Commission*, 883 F.2d 537 (7$^{th}$ Cir., Aug. 18, 1989).
Barrie, "The Complete Idiot's Guide to Options and Futures", 2001, Alpha Books, p. 1, 120-121.
CBOT, "Trading the CBOT Mini-sized Dow," Oct. 2003, www.cbot/dow, vol. II, iss. 1, p. 1-20.
CMM, "E-Mini Russell 2000 Options Strategy Listings on CME Globex," Mar. 2005, www.cme.com, p. 1-6.
Graham, "Put/Call Parity and Synthetic Positions," Dec. 2003, www.optionvueresearch.com, p. 1-3.
Notification of Transmittal of the International Search report and The Written Opinion of the International Searching Authority, or the Declaration, PCT/US/07/66418, 12 pages, Nov. 21, 2008.
Notification of Transmittal of the International Search report and The Written Opinion of the International Searching Authority, or the Declaration, PCT/US07/66408, 14 pages, Nov. 26, 2008.
Australian Stock Exchange, "LEPOs: Low Exercise Price Options Explanatory Booklet" [online] Jun. 2003, p. 1-21, [retrieved on Nov. 16, 2008]. Retrieved from the Internet: URL:hhttp://www.asx.com.au/markets/pdf/UnderstandingLEPOs.pdf, especially p. 3, left col., first paragraph; p. 15, right col., third and fourth paragraphs, 25 pages.
Notification of Transmittal of the International Search Report and The Written Opinion of the International Searching Authority, or the Declaration, PCT/US07/66407, 13 pages, Dec. 17, 2008.
International Preliminary Report on Patentability/Written Opinion of the International Searching Authority, PCT/US2007/66408, Nov. 26, 2008, 9 pages.
International Preliminary Report on Patentability/Written Opinion of the International Searching Authority, PCT/US2007/66418, Nov. 21, 2008, 8 pages.
Office Action from U.S. Appl. No. 11/553,521, dated Sep. 8, 2008, 26 pages.
Office Action from U.S. Appl. No. 11/553,521, dated Mar. 3, 2009, 35 pages.
Office Action from U.S. Appl. No. 11/553,527, dated Sep. 5, 2008, 29 pages.
Office Action from U.S. Appl. No. 11/553,527, dated Mar. 13, 2009, 39 pages.
Office Action from U.S. Appl. No. 11/553,548, dated Oct. 31, 2008, 21 pages.
Office Action from U.S. Appl. No. 11/553,548, dated Apr. 17, 2009, 21 pages.
Office Action from U.S. Appl. No. 11/553,557, dated Oct. 29, 2008, 17 pages.
Office Action from U.S. Appl. No. 11/553,557, dated Feb. 18, 2009, 36 pages.
Advisory Action from U.S. Appl. No. 11/553,557, dated Mar. 13, 2009, 3 pages.
Office Action from U.S. Appl. No. 11/553,550, dated Feb. 3, 2009, 23 pages.
Office Action from U.S. Appl. No. 12/258,734, dated Apr. 2, 2009, 21 pages.
Office Action from U.S. Appl. No. 11/553,584, dated Sep. 9, 2008, 22 pages.
Office Action from U.S. Appl. No. 11/553,584, dated Jan. 27, 2009, 38 pages.
Transaction History from Pair, (PTO Website), for U.S. Appl. No. 11/553,521, dated Apr. 28, 2009.
Transaction History from Pair, (PTO Website), for U.S. Appl. No. 11/553,527, dated Apr. 28, 2009.
Transaction History from Pair, (PTO Website), for U.S. Appl. No. 11/553,548, dated Apr. 28, 2009.
Transaction History from Pair, (PTO Website), for U.S. Appl. No. 11/553,557, dated Apr. 28, 2009.
Transaction History from Pair, (PTO Website), for U.S. Appl. No. 11/553,550, dated Apr. 28, 2009.
Transaction History from Pair, (PTO Website), for U.S. Appl. No. 12/258,734, dated Apr. 28, 2009.
Transaction History from Pair, (PTO Website), for U.S. Appl. No. 11/553,584, dated Apr. 28, 2009.
The Federal Register, "Self-Regulatory Organizations; American Stock Exchange LLC; Order Granting Approval to Proposed Rule Change and Amendment Nos. 1, 2, and 3 and Notice of Filing and Order Granting Accelerated Approval of Amendment No. 4 Relating to Listing and Trading o Shares of the xtraShares Trust," Oct. 11, 2005, vol. 70, Iss. 195, pp. 1-18.

* cited by examiner

TRADING OF DERIVATIVE SECURED INDEX PARTICIPATION NOTES

This application claims priority from and incorporates herein U.S. Provisional Application No. 60/794,481, filed Apr. 24, 2006, and titled "TRADEABLE INDEX CERTIFICATES".

BACKGROUND

Index funds allow an investor to invest in a single investment instrument that racks the performance of a portfolio of investments. In general, an index fund issues shares that represent a fractional interest in a portfolio of investments, which are weighted similarly to those portfolio of investments, which are weighted similarly to those portfolio of investments as weighted for a published securities index, e.g., stock index, in order to mirror, track, or generally correspond to the price and/or yield performance of the stock index.

One example of an index fund is a Standard & Poor's Depository Receipt ("SPDR"). An SPDR is a type of security known as a portfolio depository receipt (also known as an Exchange Traded Fund), which represents an undivided ownership interest in a portfolio of stocks held by the SPDR Trust. The SPDR Trust holds a portfolio of stocks that is intended to mirror, track, or generally correspond to the price and/or yield performance of the S&P 500 Index.

Securities, like SPDRs, may trade on a stock exchange, a securities market or an electronic communication network. The price of such securities during intra-day trading is determined by supply and demand. In particular, depository receipts issued by the SPDR Trust may be generated or redeemed on any business day at the next calculated net asset value (NAV), but only in "creation units" of 50,000 SPDR shares. SPDR creation units are generated or redeemed through an in-kind transfer of the basket of stocks that correspond to the stocks listed in the S&P 500 Index. Although the NAV of the SPDR Trust is only published at the close of every business day, the value of the corresponding S&P 500 index is published continuously throughout each trading day and distributed electronically to brokers and dealers throughout the world. Similarly, a number corresponding to the intra-day value of each SPDR share, based on the most recently traded prices of the stocks of the S&P 500 index in the current day's SPDR creation unit, is ordinarily published at 15 second intervals throughout the trading day.

Index futures contracts and index options provide other techniques for investors to invest, trade, or hedge based on the performance of an index. An index futures contract is a futures contract on a financial index such as the S&P 500 index, whereas index options are instruments that give the holder the right to receive cash settlements based on changes in the underlying index on which the option is based. A call index option would ordinarily give a payout if the index rises above its strike price, whereas a put index option would give a payout if the index fails, below its strike price.

SUMMARY

According to an aspect of the present invention, a method of intra-day trading of Index Participation Notes includes accessing, using a computer system, a value of a creation unit based on cash and a value of an index futures contract or index. The method also includes trading the shares on a securities trading venue by buyers and sellers determining a price between buyers and sellers for the Index Participation Notes taking into consideration information about the price for the index futures contract or index.

Embodiment can include one or more of the following.

The Index Participation Notes can be backed by a long index futures contract. Accessing the price can include accessing a data feed that displays a current value for the underlying index futures contract.

The Index Participation Notes can be further backed by a defined amount of cash.

According to an aspect of the present invention, a computer implemented method of trading intra-day Index Participation Notes includes accessing a price for at least one of a long call index options contract, a short put index options contract, and an index. The method also includes trading the shares on a securities trading venue by determining a price between buyers and sellers for the Index Participation Notes taking into consideration information about the price for the at least one of the long call index options contract, the short put index options contract, or the index.

Embodiments can include one or more of the following.

The Index Participation Notes can be backed by a long call index options contract and a short put index options contract. The Index Participation Notes can be further backed by a defined amount of cash.

According to an aspect of the present invention, a computer implemented method includes listing an Index Participation Note on a security exchange, the Index Participation Note comprising a fractional share of a creation unit that includes a long index futures contract.

Embodiments can include one or more of the following.

The method can include trading the Index Participation Note on the security exchange. The method can include recording an initial mark price for the long index futures contract on the issue date of the futures contract and recording a contract multiplier for the long index futures contract. The method can also include calculating an amount of cash included in the creation unit on a date of generation of the creation unit. The method can also include calculating an amount of cash to add to the creation unit prior to registering on the Index Participation Note, the amount of cash can be based on the initial mark price of the futures contract and the contract multiplier.

The method can also include liquidating the Index Participation Note on a expiration date of the long index futures contract. The method can also include disclosing the contents of the creation unit. Disclosing the contents of the creation unit can include disclosing the long index futures contracts included in the creation unit and disclosing a total value of cash included in the creation unit. Disclosing a total value of cash included in the creation unit can include calculating the total value of the cash based on changes in the mark price of the long index futures contract. Disclosing a total value of cash included in the creation unit can include calculating an accrued interest on the cash and adding the accrued interest to the total value of the cash included in the creation unit.

According to an aspect of the present invention, a computer implemented method includes listing an Index Participation Note on a securities exchange. The Index Participation Note includes a fractional share of a creation unit that includes a long call index options contract and a short put index options contract with the long call index options contract and the short index put options contract having the same initial strike price and the same expiration date.

Embodiments can include one or more of the following.

The method can also include actively trading the Index Participation Note on the security exchange. The creation unit can also include a predefined amount of cash on a date of generation of the creation unit. The method can also include calculating an amount of cash to include in the creation unit prior to registering the Index Participation Note, the amount of cash being based on the initial mark price of the futures contract and the contract multiplier. The method can also include liquidating the Index Participation Note on a expiration date of the long call and short put index options contracts.

According to an aspect of the present invention, a computer implemented method includes listing an Index Participation Note on a security exchange. The Index Participation Note includes a fractional share of a creation unit that includes a long put index options contract and a long index futures contract with the long, put index options contract and the long index futures contract each having the same initial mark price and expiration date.

Embodiments can include one or more of the following.

The method can also include actively trading the Index Participation Note on the security exchange. The method can also include disclosing long index futures contract included in the creation unit, disclosing the long put index options contract included in the creation unit, and disclosing a total value of cash included in the creation unit.

One or more aspect of the invention may include one or more of the following advantages.

The issuer holds derivative instruments and cash in a custody account and issues the tradable index shares representing a fractional interest in the value of the custody account. By securitizing tradable index shares with a derivative, several advantages are provided such as reducing transaction costs involved with purchasing and trading of the tradable index shares.

For tradable index shares securitized by a futures contract, since there is no trading of the index futures contract at investor level, the tradable index shares can be traded on a securities exchange or securities market.

In addition to reducing the transaction costs for the investors, the transaction costs can also be reduced for the issuer. Rather than purchasing each of the underlying products, e.g., securities that make up the index, the issuer needs only to purchase the derivate for the index. This reduces the number of transactions necessary to generate a creation unit. In addition custodial costs of keeping and tracking the shares are reduced for the custodian by merely having custody of the derivate.

The details of one or more embodiments of the invention are set forth in the accompanying drawings and the description below. Other features, objects, and advantages of the invention will be apparent from the description and drawings, and from the claims.

DESCRIPTION

Figure 1A:
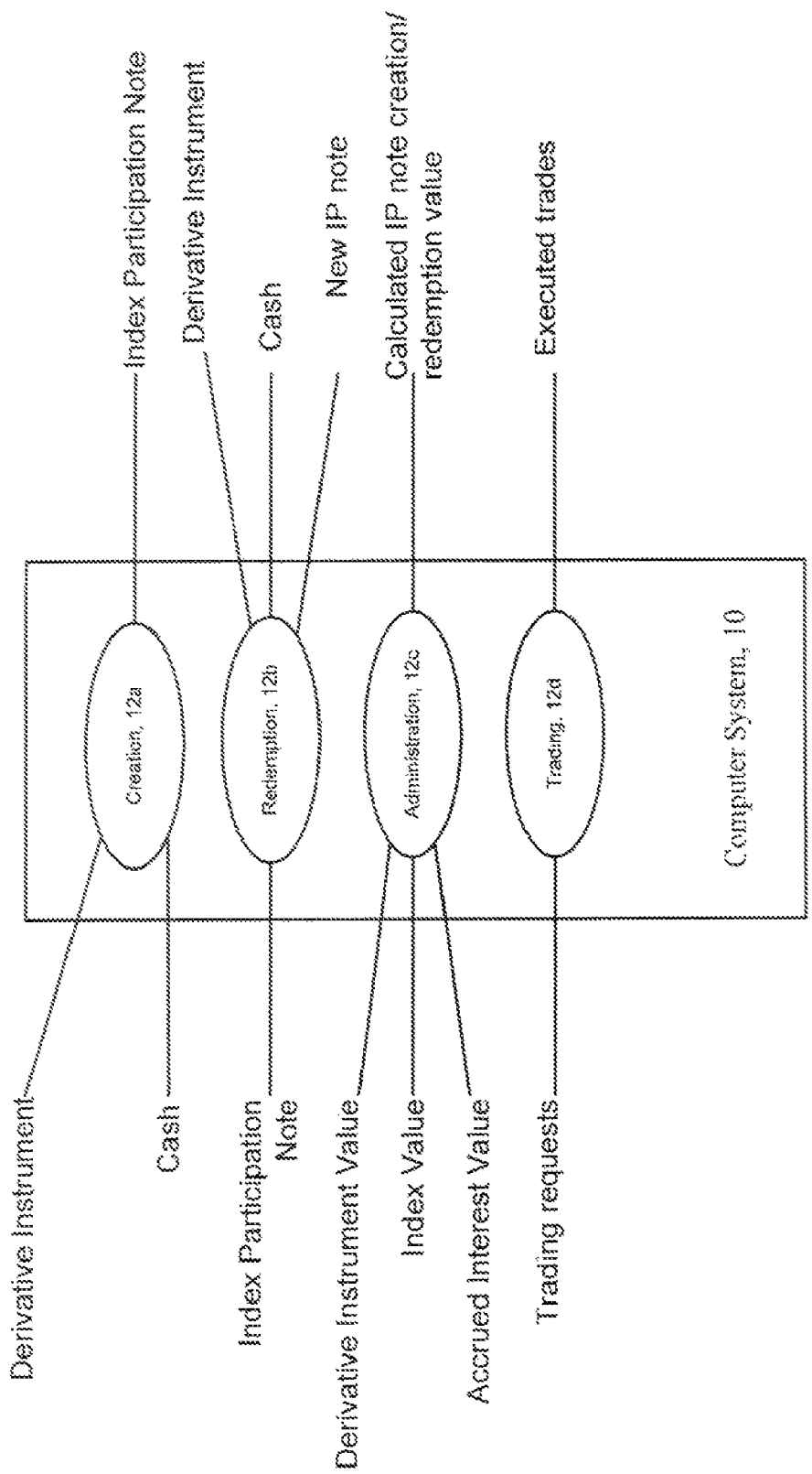
FIG. 1A is a block diagram of a computer system.

Referring to FIG. 1A, a computer system 10 includes software to assist with creation and issuance 12a, administration 12b, redemption 12c and trading 12d of Index Participation Notes. Although a single computer system 10 is shown, typically many such systems can be used and indeed each of the software processes can be performed on different computers, controlled by or managed by different entities that are involved in any of the aspects of the Index Participation Notes.

Figure 1B:
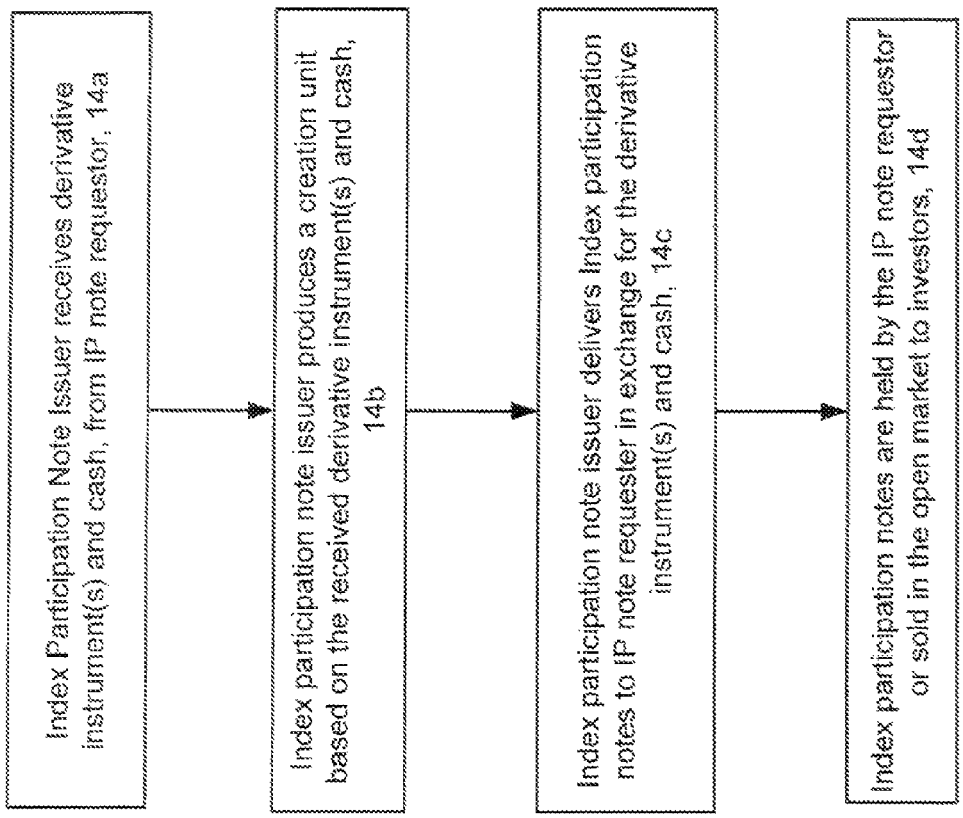
FIG. 1B is a flow chart depicting issuance of Index Participation Notes.

Referring to FIG. 1B, an Index Participation Note issuer receives (14a) a derivative instrument and cash from an Index Participation Note requestor and produces (14b) a creation unit based on the received derivative instrument and cash. The Index Participation Note issuer issues (14c) Index Participation Notes that are held by the Index Participation Note requestor or traded by investors (14d) over exchanges, securities markets, electronic communication networks (ECN's) and other trading venues.

The creation unit holds a derivative interest plus cash to secure the Index Participation Notes. The creation unit is provided to track an aspect of performance of a particular index or indexes of securities, several examples of which will be described below. Non-limiting examples of indexes include The Nasdaq-100® or The Standard & Poor's 500 Index®, as well as any other index of underlying constituent instruments that have correspondingly traded derivative instruments regardless of asset class (e.g., equity, fixed income, currency, commodities, etc.).

The creation unit is held by the Index Participation Note issuer and includes combination of cash and derivative positions that backs the Index Participation Notes. The Index Participation Notes represent fractional interests in the creation unit.

Figure 1C:
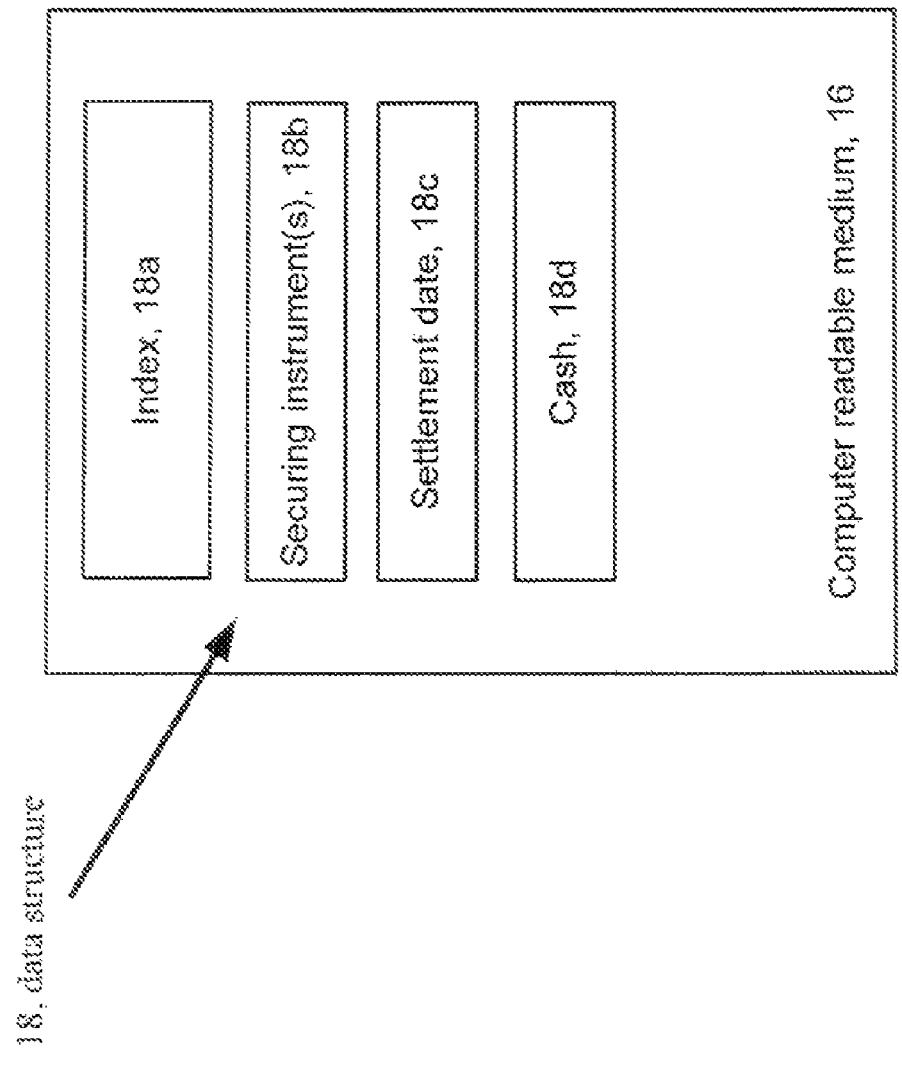
FIG. 1C is a block diagram depicting a data structure representation of an Index Participation Note.

Referring to FIG. 1C, the computer system can include a computer readable medium 16 that stores a representation of the Index Participation Notes such as in a data structure, e.g., 18 used with software that assists with creation and issuance, administration, redemption and trading of the Index Participation Notes. Other representations are possible including unstructured representation, a record and so forth.

An exemplary data structure 18 used to represent the Index Participation Notes can include a field that identifies the index 18a, one or more fields that identify the derivative instrument securing the Index Participation Notes 18b, a field indicating the settlement date of the derivative instrument 18c, and a field storing the value of cash included in the creation unit 18d. As described below, the field storing the value of the cash 18d is updated as the value of the Index Participation Notes changes.

As will be described below, various types of Index Participation Notes are possible. Therefore, fields can be included in the representation of the Index Participation Notes for identifying the types of notes and whether the notes roll over or are cashed out at maturity and so forth.

In one embodiment, the Index Participation Notes 22 are based on a derivative that is an index futures contract on the index which the Index Participation Note tracks. The Index Participation Note issuer may charge a fee which could be included at issuance, redemption, or during the interim between issuance and redemption of the Index Participation Notes 22. If a fee is charged at issuance, the Index Participation Note issuer adds the fee to the price of the Index Participation Notes. On the other hand, if a fee is charged at redemption, the Index Participation Note issuer subtracts the fee from the determined total value of the investor's Index Participation Notes on the redemption note.

Creation of Index Participation Notes with Futures Positions

Figure 2:
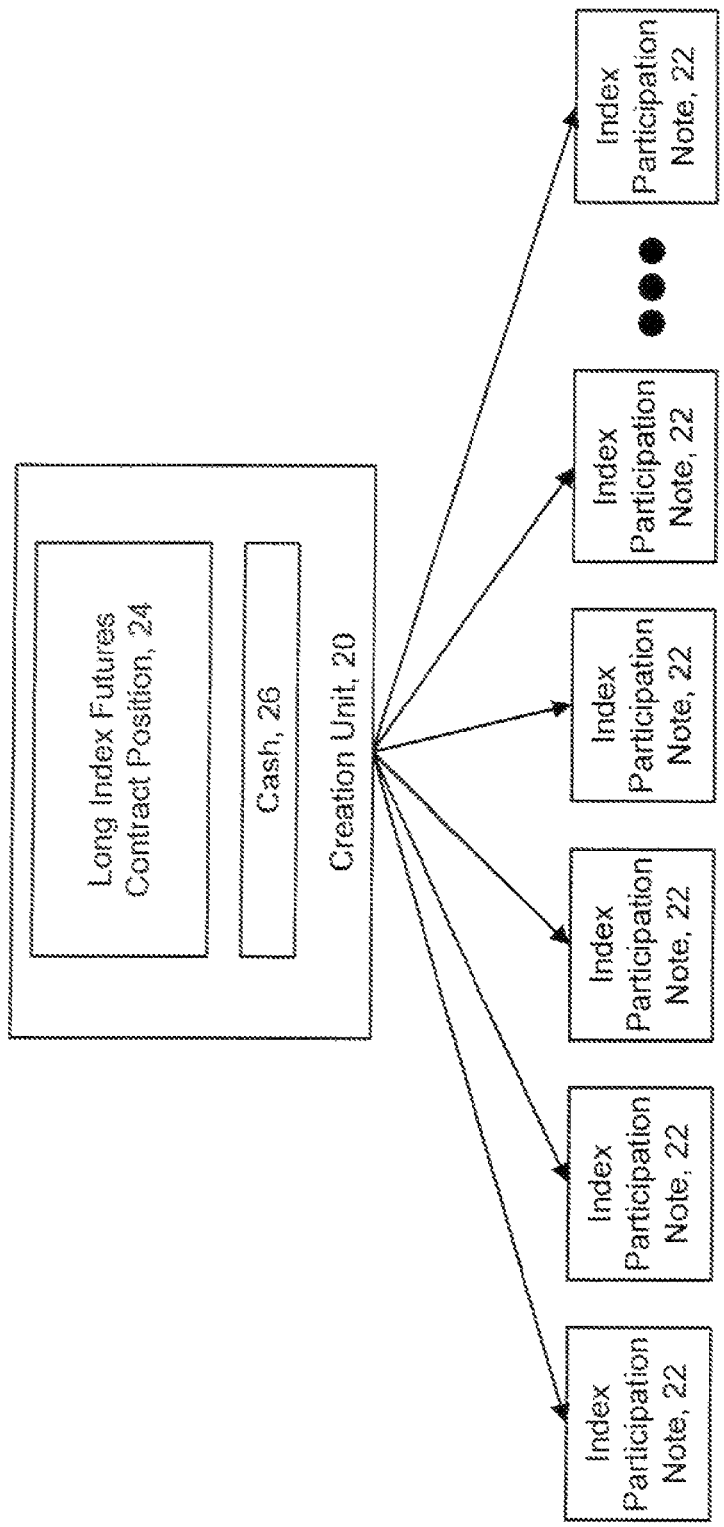
FIG. 2 is a block diagram of a creation unit and multiple Index Participation Notes.

Referring to FIG. 2, one embodiment of the Index Participation Notes 22 represents a fractional interest in a creation unit 20 that includes both an index futures contract 24 and a defined amount of cash 26. Each creation unit 20 is divided into a predefined number of Index Participation Notes 22. For example, creation unit 20 can be partitioned into 'N' Index Participation Notes 22, such that each Index Participation Note 22 represents a $1/N^{th}$ ownership interest in the index futures contract 24 and $1/N^{th}$ ownership interest in the cash 26 included in the creation unit 20.

For example, in some embodiments, the value of the Index Participation Note 22 can be selected to be 1/10 of the value of the index. Because the index futures contracts often have a multiplier associated with them (e.g., the contract multiplier for the S&P 500® is 250), in order to have the value of the Index Participation Note be approximately equal to one-tenth of the value of the index, the creation unit can be divided into a number of Index Participation Notes equal to ten times the contract multiplier (e.g., 2500 for the S&P 500® example above). Other partitions of the creation unit 20 into 10 other amounts of Index Participation Notes 22 are possible. The number of Index Participation Notes corresponding to a single creation unit can be dependent on the value of the creation unit 20. For example, the number of Index Participation Notes can be such that the total value of the cash in the creation unit 20 divided by the number of Index Participation Notes is between $10 and $10,000.

The index futures contract 24 included in the creation unit 20 is a long index futures contract position. An index futures contract position is a futures contract based on a index. One exemplary type of index is a financial index such as the NASDAQ-100® or S&P 500®. Another exemplary type of index is a commodities index. Index futures contracts are contractual agreements to make or receive cash payments that are economically equivalent to buying or selling a particular index-based financial instrument at a pre-determined price in the future. In the case of an index futures contract 18, the predetermined price is the price of the index at a particular date specified by the index futures contract 24 (referred to as the settlement date).

The amount of cash 26 included in the creation unit 20 varies over time as the value (e.g., the mark price) of the index futures contract 24 changes. The computer executing the creation process (or another processing device) computes the initial amount of cash 26 to be placed in the creation unit, tracks changes in the value of the cash 20, and provides up-to-date summaries of the value of the cash 26 included in the creation unit 20. As index futures contracts are cash settled contracts (as opposed to commodity futures contracts which can be settled by delivery/acceptance of delivery of the underlying security or commodity), the index futures contract 24 settles by a cash amount which is economically equivalent to the value of the index on the maturity date of the contract times the contract multiplier that scales the size of the contract relative to the value of the index. Thus the computer calculates the value of the cash 26 on any particular date prior to settlement by multiplying the last futures-mark-price for index futures contract 24 by its contract multiplier established on the day of creation of the Index Participation Notes 22. If the cash 26 is held in an interest bearing account, the computer also tracks the changes in the total value of the cash 26 in the creation unit 20 on any day after creation to reflect principal value (as described above) plus accrued interest.

Figure 3:
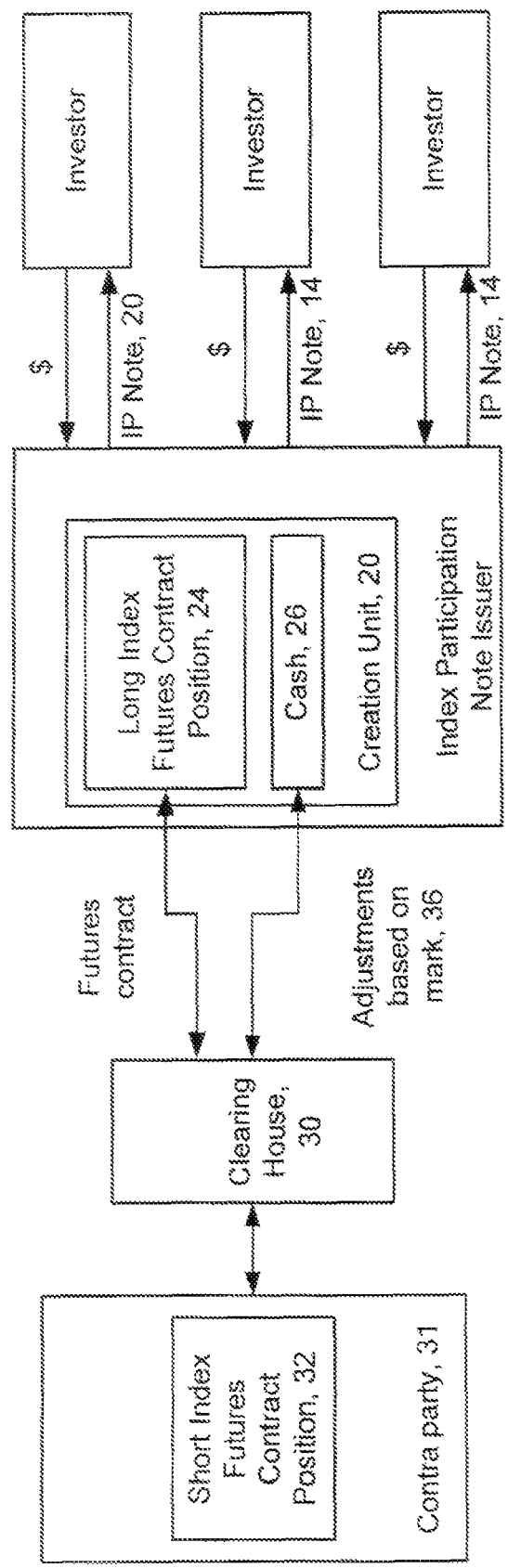
FIG. 3 is a block diagram depicting relationships among entities.

Referring to FIG. 3, in order to facilitate creation of Index Participation Notes 22, futures positions are established between a contra-party 31 and the Index Participation Note-requestor using a clearing house 30. The Index Participation Note requestor establishes a long index futures contract position 24 while the contra-party 31 establishes a short index futures contract position 32. Since the long and short positions are used to determine future credits/debits, no money (other than applicable fees) is exchanged between the clearing house 30 and the Index Participation Note requestor during formation of the long and short index futures contract positions 24 and 32. Both the long and short index futures contract positions 24 and 32 are established based on a "mark price" for the index future on the day the contracts 24 and 32 are formed. Money is subsequently exchanged between the contra-party 31 and the Index Participation Note requestor based on differences between the mark price established on the day of issuance of the index futures contract and the current mark price for the index futures contract (as indicated by arrows 36 and described below in relation to FIGS. 5 and 6). Any changes to the mark price (and therefore to the value of the cash 26 in creation unit 20) are tracked by the computer system such that an accurate value for the cash 26 can be known and reported.

After the futures positions 24 and 32 have been established between the contra-party 31 and the Index Participation Note requestor, the Index Participation Note requestor requests to generate a creation unit of Index Participation Notes with the Index Participation Note issue who produces a creation unit 20. As described above, the creation unit 20 holds the index futures contract 24 and a predefined amount of cash 20. The amount of cash 26 included in the creation unit 20 varies based on the market conditions at the time of formation of the creation unit 20. In general, the amount of cash 26 in the creation unit equals the last futures "mark price" for the index future 24 multiplied by the contract multiplier for the futures contract. An example of the contents of an exemplary creation unit 20 is provided below.

In the following example, the Index Participation Notes 22 represent a fractional interest in a creation unit 20 based on the S&P 500 Index®. At the time of establishment of the creation unit, the S&P 500 Index® has the following market conditions:

Last S&P 500 Futures-Mark-Price=1200

S&P 500 Index Futures Multiplier=250

Based on these market conditions, a creation unit 20 would include an S&P 500 index futures contract long position and cash in an amount equal to the S&P 500 index future contract's last "futures-mark-price" times the index's contract multiplier as they exist on the day of formation of the creation unit 20. In this example, the mark price is $1200 and the contract multiplier for the S&P 500 index future is 250. thus, the creation unit 20 could be represented as follows:

One Creation Unit=1 Open Long Index Futures Contract Position+(Contract's Last Futures-Mark-Price)*(S&P 500 Contract Multiplier)

Thus, based on the exemplary market conditions described above, the creation unit would include:

One Creation Unit=1 Open Long Index Futures Contract Position+($1200)*(250)=1 Open Long Index Futures Contract Position+$300,000

Index Participation Notes 22 represent a proportional ownership stake in the creation unit 20. Initially, the Index Participation Notes 22 are quoted to investors at a price that is based on the pro-rata cash amount and the net value of the index futures contract 24 versus its last mark price at the time of quotation of the Index Participation Notes 22 after accounting for expenses and fees.

Thus, the market price of the Index Participation Note 22 is initially related to the futures mark to market price of the index on the day of formation. For example, based on the exemplary market conditions for the S&P 500 Index Participation Notes described above if each Index Participation Note 22 had a value of 1/10 of the futures price, the price of the Index Participation Note would be $120 (e.g., the last future mark price of $1200 divided by 10). Thus, there would be 2500 Index Participation Notes 22 generated based on the creation unit 20.

After purchasing of the Index Participation Note 22 from the Index Participation Note issuer, the Index Participation Note 22 can be traded using an exchange, a securities market, an electronic communication network (ECN) and other trading venues. In order to facilitate open trading of the Index Participation Notes 22, the Index Participation Notes 22 can be listed and traded like ordinary share of stock or exchange traded funds (ETFs) on one or more securities exchanges, markets and/or through the matching facilities of one or more electronic communication networks (ECNS). Secondary market trading of Index Participation Notes 22 will be at prices governed by competitive supply and demand forces taking into consideration, among other factors, the values of the index futures contract 18, cash 26 and value of the index that the Index Participation Notes 22 represent. Since the Index Participation Notes 22 would be registered and traded in a manner similar to traditional stocks on a national securities exchange, the Index Participation Notes 22 will be available to be traded and held through any ordinary stock brokerage account and handled by any one of the Registered Representatives in the United States today.

As described above, the Index Participation Note issuer holds the futures contract 24 and cash in a custody account and issues Index Participation Notes 22 representing a fractional interest in the value of the custody account. Since the futures contract 24 is held by the Index Participation Note issuer in a custody account (as opposed to being held by the investors), the ownership of the futures contract 24 does not change as the Index Participation Notes 22 are traded. This provides various advantages such as, for example, reducing transaction costs involved with purchasing and trading the Index Participation Notes 22. In addition, since there is no trading of the index futures contract 24 at the Index Participation Note investor level (e.g., by Index Participation Note investors), the Index Participation Notes 22 can be traded on a securities exchange.

In addition to reducing the transaction costs for the investors, the transaction costs can also be reduced for the Index Participation Note issuer and thus to IP note holders. For example, rather than purchasing each of the underlying securities that make up the index, the Index Participation Note issuer needs only to purchase the index futures contract 24 for the index. By reducing the number of transactions necessary to generate a creation unit 20 (e.g., a single transaction to purchase the index futures contract 24 versus multiple transactions to purchase each of the securities in the index), the transaction costs for the Index Participation Note issuer are reduced.

Figure 4:
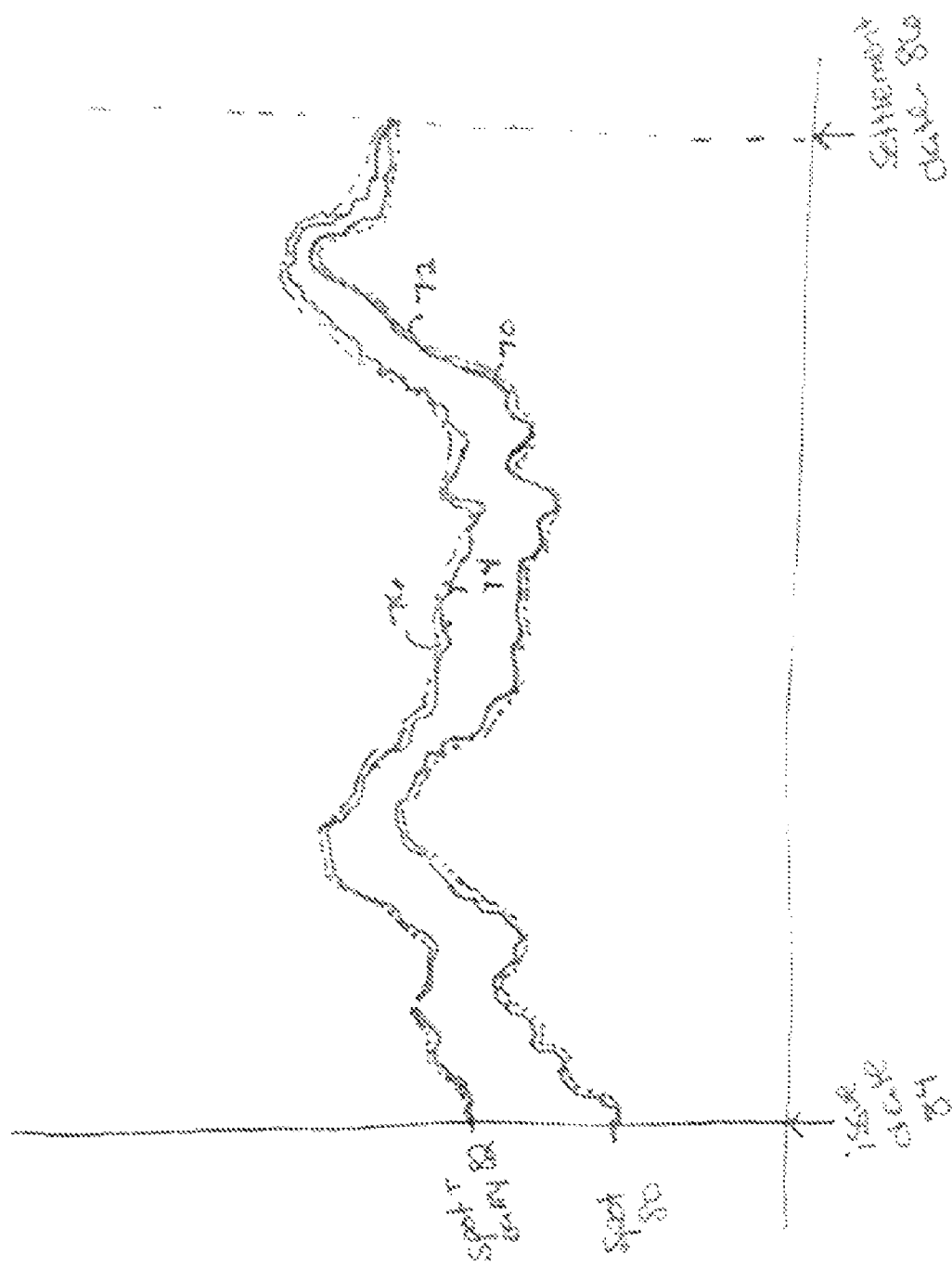
FIG. 4 is a chart of the value of an Index Participation Note relative to other investment vehicles.

Referring to FIG. 4, in an illustrative non-limiting example, the value of an index fund (represented by line 70) closely tracks the value of the stocks included in the index fund (represented by line 72) because the index fund is comprised of a basket of stocks which track, resemble or replicate the stocks underlying the index. It is believed that the intra-day and day-to-day market value of Index Participation Notes 22 will in general closely track the pro-rata value per note outstanding of the Index Participation Note custody account which holds the index futures contract 24 and cash 26 held by the Index Participation Note issuer.

Put another way, the value of the Index Participation Notes 22 (represented by line 76) is expected to track the price of the index futures contracts (represented by line 74). The tracking between the value of the Index Participation Notes 22 and the value of the index futures contract 24 is based on the inclusion of both the index futures contract 24 and the cash 26 in each creation unit 20 for the Index Participation Notes 22. Since the cash 26 included in the creation units 20 varies based on the performance of the index futures contract 18, the value of the creation unit 20 (and therefore the value of the Index Participation Note 22) will vary based on the performance of the index futures contract 18.

On the issue date of the Index Participation Notes 22 (indicated by arrow 84), the value of the index and the value of the Index Participation Notes 22 will, in general, be different. The value of the Index will be equal to the value of the underlying stocks included in the index (indicated by spot value 80), whereas the value of the index futures contract may diverge.

As stated above the value of the Index Participation Notes 22 will track the value of the index futures contract 18. However, because the theoretical value of an index futures contract 24 includes two components, namely "spot value" plus "carry value," initially, the index futures contract 18, and therefore the Index Participation Notes 22, will closely track movements of the index but will diverge in absolute value to the extent of the carry value. The spot value of the index futures contract is the cash price required to acquire the underlying stocks and the carry value of the index futures contract is the expected cost to hold an ownership interest in the underlying stocks until the settlement date 86. The spot value for the index futures contract will closely track the value of the index while the carry value will vary based on interest rates reflecting the purchase price of the underlying index stocks and the dividend yield on the index stocks held through settlement date. As the settlement date nears, the carry value for the index futures contract 24 approaches zero such that the value of the Index Participation Note 22 converges to the value of the underlying index as the index futures contract which itself converges to the underlying index.

While this arrangement the Index Participation Note 22 backed by the long index futures contract and the long cash position is economically equivalent to being long the basket of stocks included in the index. More particularly, since the Index Participation Notes 22 correspond in value to long positions in both cash 26 and the index futures contract 18, held in the Index Participation Note issuer's custody account, the value of the Index Participation Notes 22 on the settlement date 86 will converge to the value of the underlying index. Accordingly, as shown in FIG. 4, the value of the Index Participation Notes 22 (represented by line 76) and the value of the index (represented by line 70) converge to the same price 78 on the settlement date 86. Thus, the position claimed by the Index Participation Notes 22 (i.e., long cash and long an index futures contract) as the same economic value as owning the underlying stocks on the settlement date 86.

Figure 5:
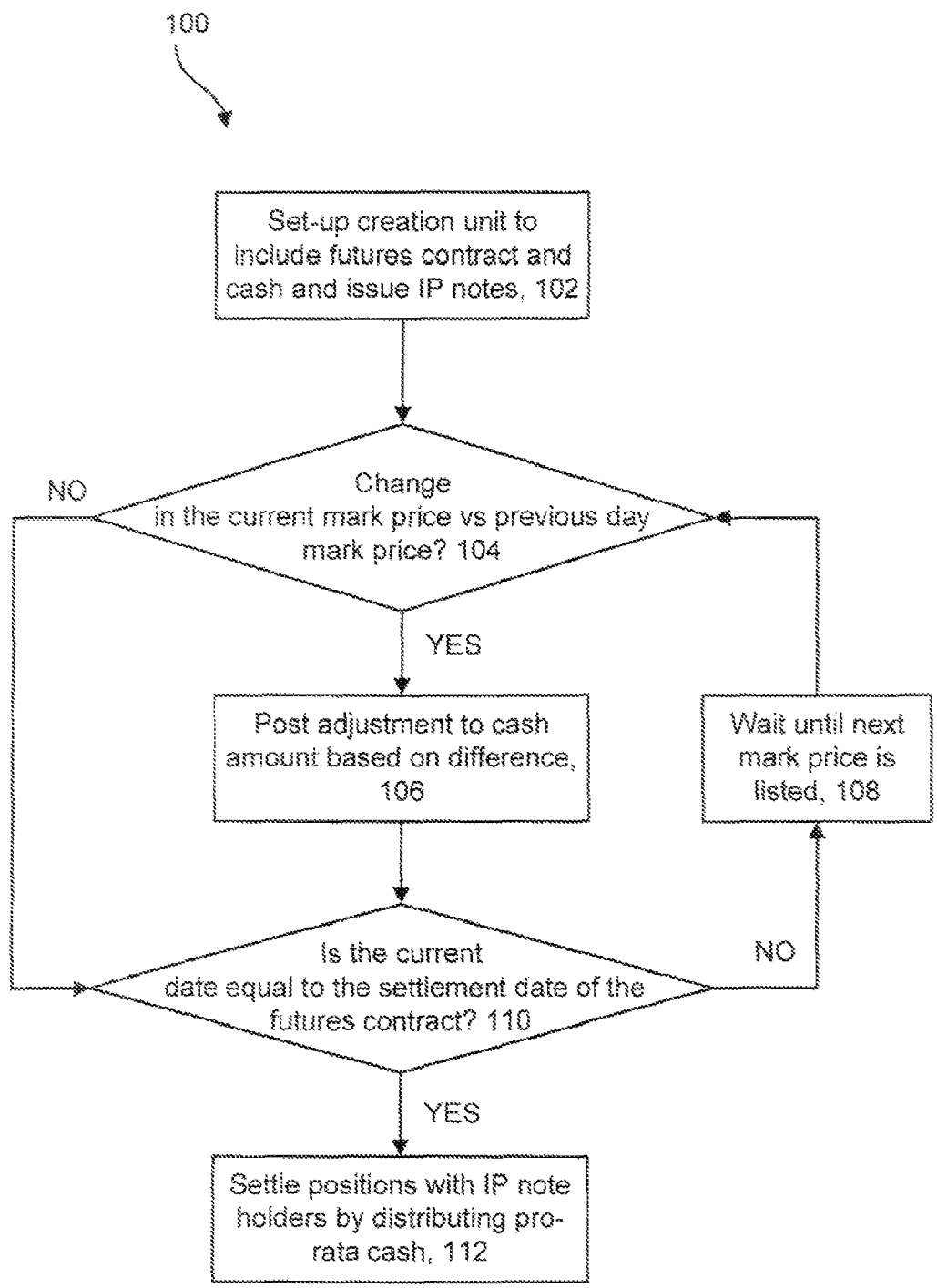
FIG. 5 is a flow chart of a cash adjustment process for a creation unit.

Referring to FIG. 5, a process 100 for adjusting the amount of cash 26 in the creation unit 20 based on the performance of the index futures contract 24 is shown. As described above, the intrinsic day-to-day value of the Index Participation Note 22 will vary based on the prices performance of the index future contract 24.

The creation unit 20 is initially established to include the index futures contract 24 and an amount of cash 26. A computer system stores the contents of the creation unit 20, e.g., the index futures contract 24 and the amount of cash 26 and records the fractional interest represented by each of the Index Participation Notes 22. On the date of formation of the index futures contract 24 a strike price (also referred to as the initial mark price) is established (102). Since the mark price is used subsequently to determine adjustments in the cash 26, the computer stores the mark price.

The initial mark price for the index futures contract is subsequently updated at predetermined time intervals (e.g., the close of each daily trading session). After the mark price has been updated, the computer stores the new mark price and compares the new mark price to the previous mark price (104) to determine if there has been a change. If there is a difference between the current and previous mark prices, the accounts of the long position holder and short position holder of the futures contracts are adjusted based on the difference (106).

Since the Index Participation Note issuer holds a long index futures contract 24, if the mark price increases, the difference between the two mark prices (e.g., a positive value) will be credited to the Index Participation Note issuer's account at the clearing house 30 and the difference between the two mark prices will be debited from the account of the contra-party 31 that holds the short index futures contract position. In contract, it the mark price decreases, the difference between the two mark prices will be debited from the Index Participation Note issuer's account and the difference between the two mark prices will be credited to the account of the contra-party 31.

The intrinsic value of the Index Participation Note 22 will increase when the mark price for the index futures contract 24 rises and will decrease when the mark price for the index futures contract 24 falls. All changes in the value of creation unit 20 (e.g., changes in the value of the cash 20) are tracked by the computer system.

After the accounts of the Index Participation Note issuer and the contra-party 31 have been adjusted or if no adjustment is needed, the computer system determines if the current date is equal to the settlement date for the index futures contract 24 (110). If the date is not the settlement date, the determination of change in mark price and adjustment of the accounts is repeated. If the date is the settlement date, the positions of the Index Participation Note holders are settled based on the change in value of the Index Participation Note 22 (112).

Figure 6:
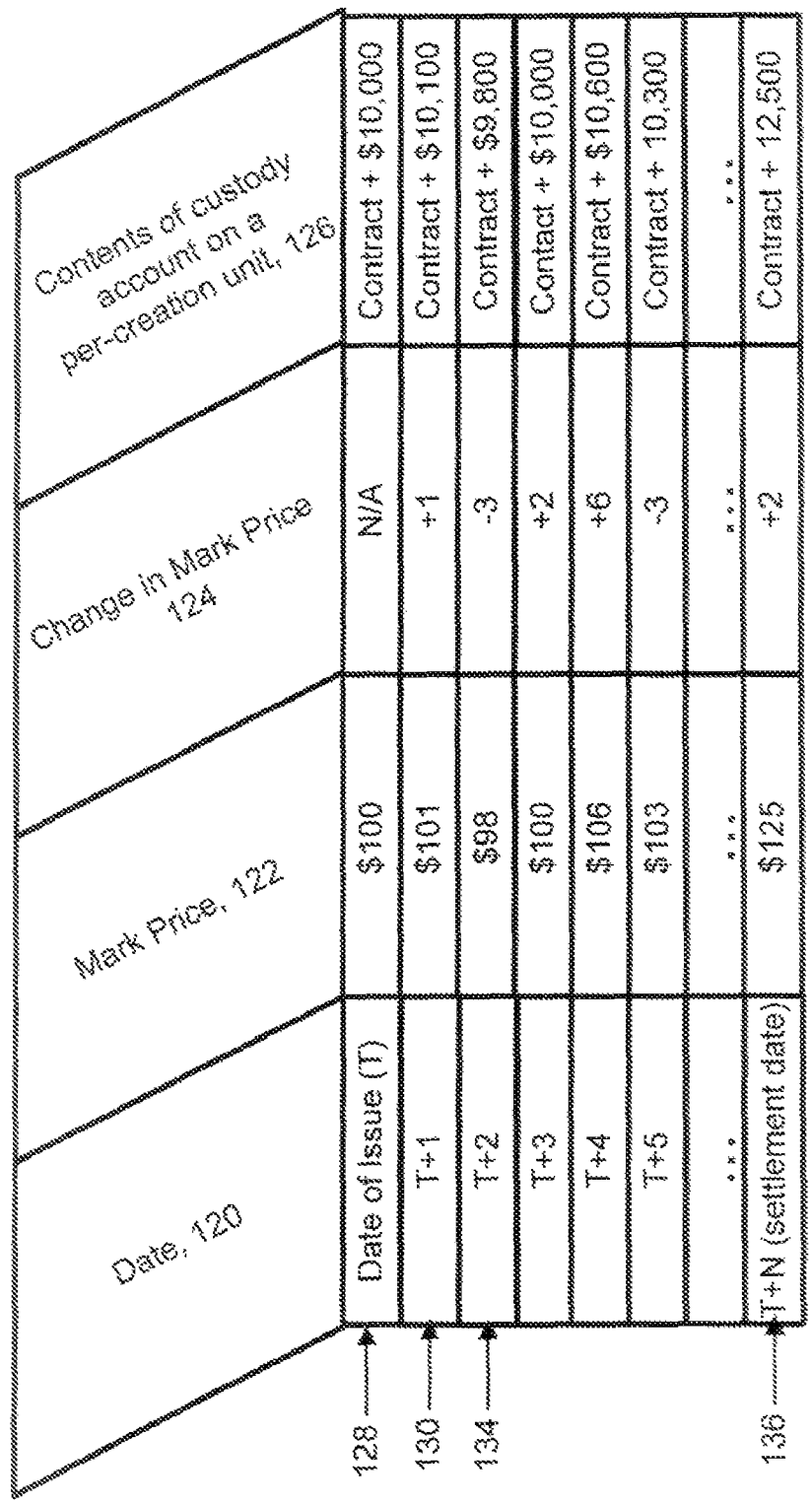
FIG. 6 is a chart of changes in a mark price and related changes in the cash value of a creation unit.

Referring to FIG. 6, exemplary adjustments to the contents of a creation unit 20 (represented in column 126) based on the changes in the mark price (shown in columns 122 and 124) for the underlying index futures contract 24 are shown. On the date of issue of the index futures contract 18, an initial mark price is established. As shown in row 128, on the date of issue (T), the mark price 122 for the index futures contract is $100. In this example, the index multiplier for the index future is assumed to be one-hundred for ease of explanation. As such, the contents of the creation unit 20 upon establishment include the index futures contract 24 and the defined cash 26 amount that equals the index futures contracts' strike price multiplied by the contract multiplier. As shown in row 130, on the day following the date of issue (T+1), the mark price 122 for the index futures contract has increased to $101. Thus, the change in the mark price 124 is +1 and the amount of cash in the creation unit 20 increases by $100 and $10,100. As shown in row 132, on the following day (T+2), the mark price for the index futures contract has decreased to $98. Thus, the change in the mark price 124 is –3 and the amount of cash in the creation unit 20 decreases by $300 to $9,800. Such adjustments continue until the date of settlement of the index futures contract 18.

Figure 7:
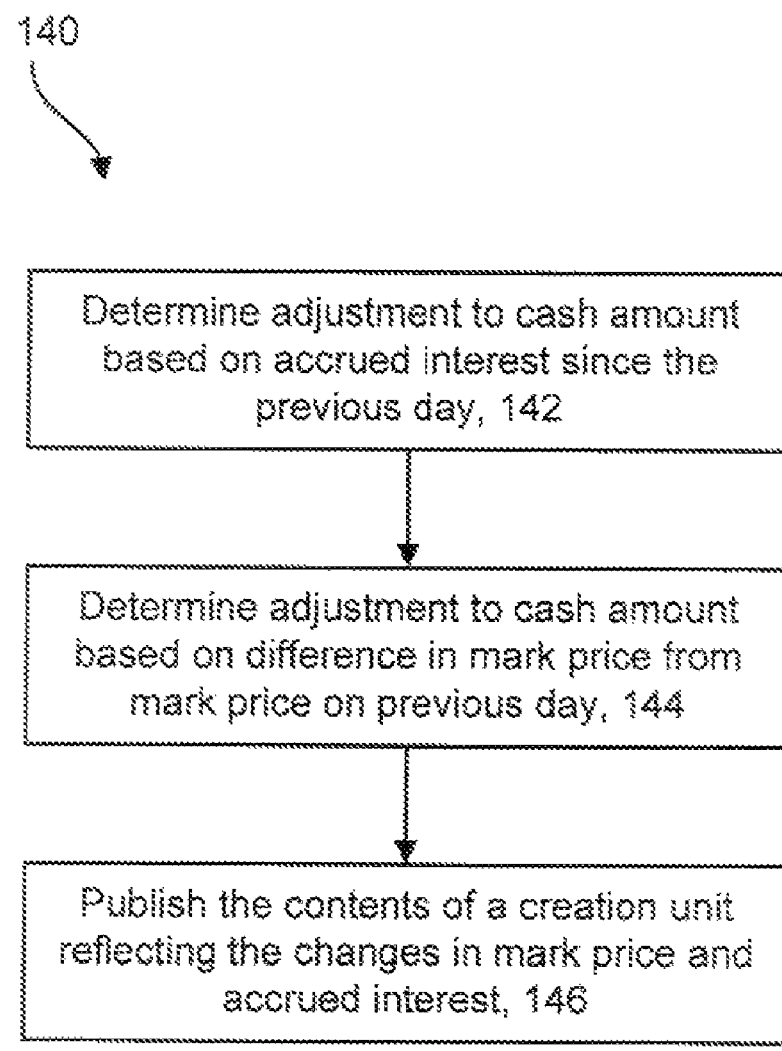
FIG. 7 is a flow chart of a process for adjusting the cash amount included in a creation unit.

Referring now to FIG. 7, the contents of the creation unit, and thus the value of each Index Participation Note, are adjusted based on accrued interest on the cash 26 held in the creation unit 20. For example, the cash 26 included in the creation unit 20 could be held in treasurer's notes or an interest bearing account or other type of interest bearing instrument including the clearing member's interest bearing account at the clearing house. The interest earned is credited to the value of the creation unit 20. If the cash 26 is held in an interest bearing account, the value of the cash 26 increases over time. In order to accurately assess the value of the Index Participation Notes 22, a computer maintains an accurate representation of the value of the index futures contract 24 and the value of the cash 26 (including both adjustments based on the performance of the futures contract and based on the accrued interest).

A computer implemented process 140 for reporting the current value of a creation unit 20 includes using a computer system to determine adjustments to the cash 26 based on the accrued interest since the previous reporting period, for example, the accrued interest since the previous day (142). The computer system also determines adjustments to the cash 26 based on differences between the current mark price and the previous mark price (144). After determining both the adjustment to the cash 26 based on the performance and the interest, the computer system provides the necessary information for the Index Participation Note issuer to publish the contents of the creation unit 20 to reflect the current value of the cash 26 included in the creation unit 20 (144).

The value of the creation unit 20 on any given day is primarily the value of the cash 26 included in the creation unit. The relative proportion of value of the index futures contract 24 to the cash 26 included in the creation unit 20 is low. The majority of the value of the creation unit 20 is cash 26 because the index futures contract 24 simply adjusts the total amount of cash 26 by incremental amounts on a day-to-day basis. Thus, the value of the index futures contract 24 in the creation unit 20 is effectively converted to a cash amount (e.g., the adjustment based on the mark price) each day. Since the value of the creation unit 20 and, thus, the Index Participation Notes 22, is primary based on the cash 26 included in the creation unit 20, and a financial claim on cash is a security and not a commodity, the Index Participation Notes 22 are securities that can be traded on a securities market.

Redemption/Settlement of Index Participation Notes

As described above, the Index Participation Notes 22 are based on a creation unit 20 that includes an index futures contract 24 and a defined amount of cash 20. The index futures contract 24 has a settlement date that is set and known at the date of issuance of the index futures contract 18. Since the Index Participation Notes 22 are based on the index futures contract 18, in some embodiments, the Index Participation Notes 22 also have a fixed term.

Figure 8:
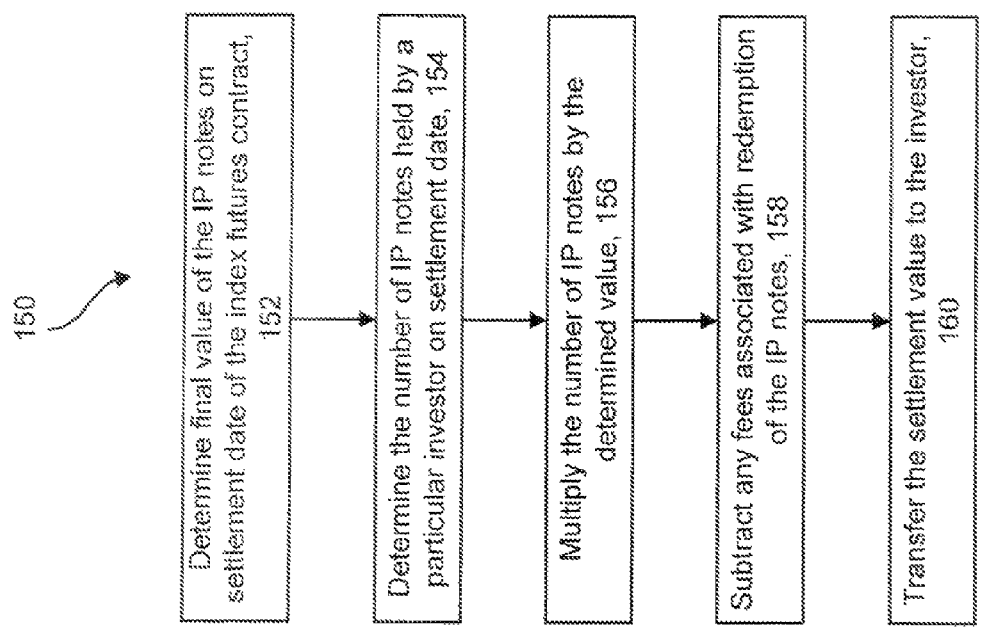
FIG. 8 is a flow chart of a settlement process.

Referring to FIG. 8, in one embodiment, the Index Participation Notes 22 have a fixed term, e.g., a settlement/liquidation date that coincides with a settlement/liquidation date underlying the futures contract 18. A process 150 for settlement of fixed term Index Participation Notes 22 includes determining, typically by the Index Participation Note issuer, the final value for the Index Participation Notes 22 on or after the settlement of the index futures contract 24 (152).

A computer system calculates the final value of the Index Participation Notes 22 based on the mark price for the futures contract 24 on the settlement date and any interest accrued on the cash 26 in the creation unit 20. As such, the final value calculated by the computer system reflects any changes in the mark price between issuance and redemption of the futures contract 18c and reflects the interest gained on the cash 20.

The Index Participation Note issuer determines the number of Index Participation Notes 22 held by a particular investor on the settlement date (154). The Index Participation Note issuer uses the computer system to determine the value of the Index Participation Notes 22 by multiplying the number of Index Participation Notes 22 held by the investor by the determined value for the Index Participation Notes 22 (156).

The Index Participation Note issuer may charge a fee for redemption of the Index Participation Notes 22. If a fee is charged for redemption, the computer system subtracts the fee from the determined total value of the investor's Index Participation Notes (158). The Index Participation Note issuer transfers the value of the investor's Index Participation Notes less any fees to the investor (160).

Figure 9:
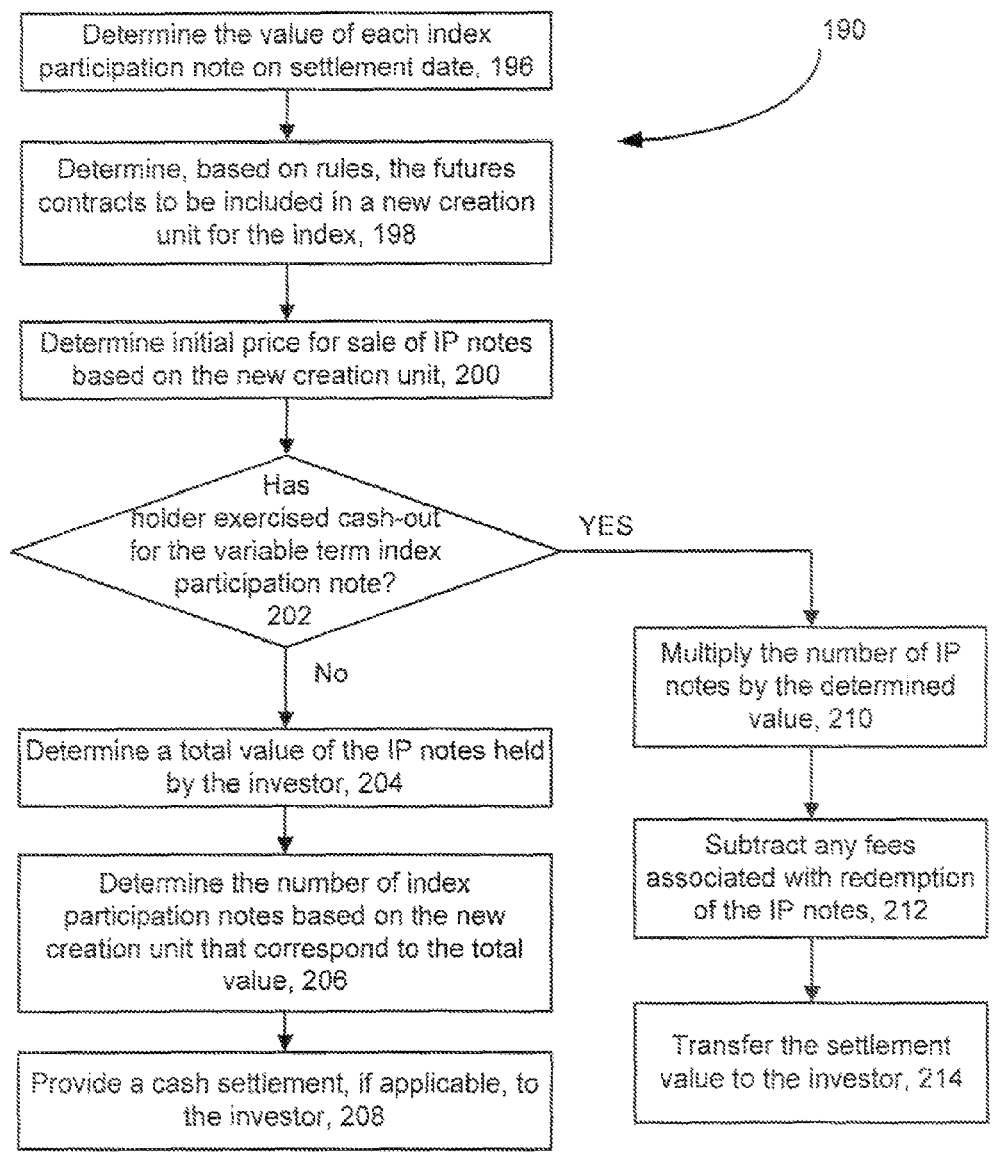
FIG. 9 is a flow chart of a settlement process.

Referring to FIG. 9, another embodiment, of the Index Participation Note 22 is one in which the term of the Index Participation Note 22 is variable. For a variable term Index Participation Note 22, the holders of the Index Participation Notes 22 may exercise a periodic, e.g., quarterly cash-out feature. Any remaining, non-exercised Index Participation Notes 22 would be subject to automatic roll-forward of expiring futures contracts. With this roll-forwarding the Index Participation Note-issuer generates a new creation unit of future-dated futures contracts. The Index Participation Note issuer rolls-forward the interest of the non-exercising Index Participation Note holders by issuing new Index Participation Notes to them based on the new creation unit. The Index Participation Note issuer uses a computer system to track the contents of the creation unit 20 before and after the Index Participation Notes 22 are rolled-forward.

Referring now to FIG. 9, a process 190 for settlement of variable term Index Participation Notes 22 is shown. On the settlement date for the index futures contract 18, the Index Participation Note issuer uses a computer to determine the value of each Index Participation Note 22 (196). The Index Participation Note issuer determines, based on rules, a new, one or more future-dated index futures contracts to include in a new creation unit based on the index (198) and goes into the market to secure those contacts following non-discretionally execution.

For example, the initial index futures contracts included in the creation unit 20 could be 2006 S&P 500® index futures contracts with a settlement date of December 2006. On the settlement date, the 2006 future contract is settled and a new index futures contract with a settlement date 1 year later (e.g., a 2007 S&P 500® index futures contract) is purchased.

After the futures contract for the new creation unit is determined, the Index Participation Note issuer uses a computer to calculate the initial price for the Index Participation Notes based on the creation unit 20 that includes the new index futures contract (200). This price could be greater than, equal to, or less than the value of the Index Participation Notes on the settlement date.

For Index Participation Notes 22 having a variable term, the holder of the Index Participation Note can decide whether to hold the Index Participation Note (and thus receive interest in the new creation unit) or to liquidate the Index Participation Note for cash. The Index Participation Note issuer determines if the note holder has exercised the cash-out option for the Index Participation Note 22 (202).

If the Index Participation Note holder has exercised the cash out option or the Index Participation Notes 22 are fixed term, the Index Participation Note issuer uses a computer to calculate the payment due to the holder of the Index Participation Notes 22. The computer multiplies the number of Index Participation Notes 22 by the determined value for the Index Participation Notes (210) and subtracts any fees associated with redemption of the Index Participation Notes 22 (212). The Index Participation Note issuer transfers the calculated settlement value to the Index Participation Note holder in exchange for or otherwise extinguishing the Index Participation Notes 22 (214).

If the Index Participation Note holder has not exercised the cash-out option and the Index Participation Notes are all variable term, the Index Participation Note issuer uses a computer system to calculate a total value of the Index Participation Notes 22 held by the investor (204). The computer system determines the number of the new Index Participation Notes that correspond to the total value of the old Index Participation Notes based on the issue price for Index Participation Notes 22 based on the new creation unit (206) and the Index Participation Note issuer issues the new Index Participation Notes 22 to the note holder.

The computer system also determines if a cash settlement is necessary to account for differences in the value of the Index Participation Notes originally held by the investor and the newly issued Index Participation Notes. If such a settlement is due, the Index Participation Note issuer provides the cash settlement, e.g., for an odd lot amount if applicable, to the Index Participation Note holder (208).

Figure 10:
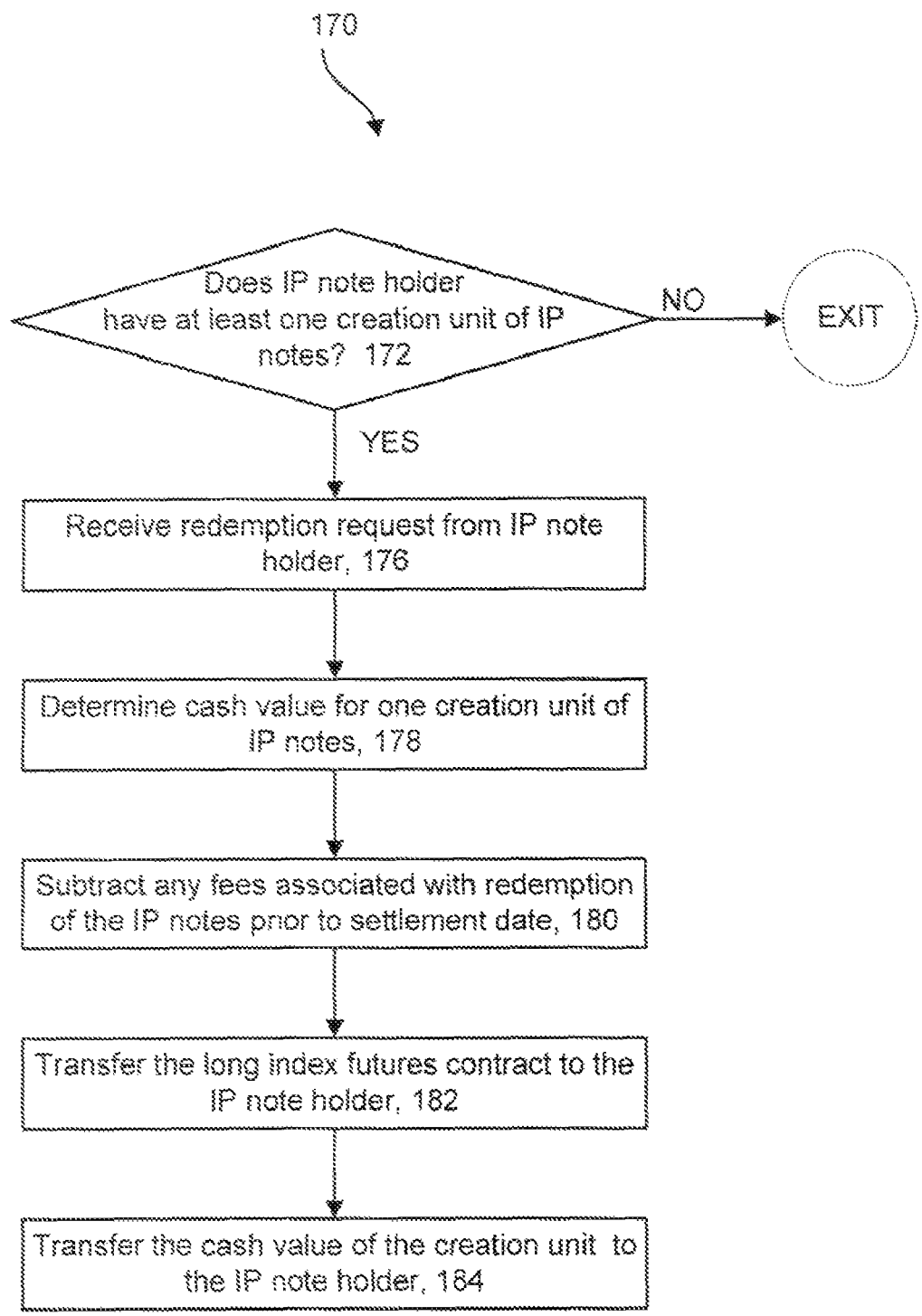
FIG. 10 is a flow chart of a redemption process for a creation unit of Index Participation Notes.

Referring to FIG. 10, in some embodiments, an Index Participation Note holder may be able to redeem Index Participation Notes 22 from the Index Participation Note issuer prior to the settlement date based on a process 170 for redeeming creation unit-size aggregations of Index Participation Notes 22 by request of an Index Participation Note holder. If the Index Participation Note issuer allows redemption of creation unit-size aggregations of Index Participation Notes 22, the Index Participation Note issuer determines if the Index Participation Note holder owns a creation unit-size aggregation of Index Participation Notes (172).

If the Index Participation Note holder does not own a creation unit-size aggregation of Index Participation Notes, the Index Participation Notes 22 may be traded on an exchange, market or other trading venue. When the Index Participation Note holder owns less than a creation unit-size aggregation of Index Participation Notes, the Index Participation Note holder can not redeem the Index Participation Notes 22 prior to the settlement date of the futures contract 18.

If the Index Participation Note holder does own a creation unit-size aggregation of Index Participation Notes, the Index Participation Note issuer receives a redemption request from the Index Participation Note holder (176). The Index Participation Note issuer uses a computer system to calculate the current pro-rata cash value for a creation unit of Index Participation Notes (178). The cash value includes the total value of the cash 26 in the creation unit 20.

The Index Participation Note issuer may charge a fee for redemption of the Index Participation Notes 22 prior to the settlement date. If such a fee is charged, the computer system subtracts the fee associated with the redemption from the total cash value of the creation unit (180). Since the settlement date of the future contract has not yet arrived, the Index Participation Note issuer transfers the futures contract 24 in the creation unit 20 (182) and transfers the cash value less any fees (184) to the Index Participation Note holder in exchange for the Index Participation Notes 22.

Creation Unit Including Multiple Index Futures Contracts

While the creation unit 20 in the embodiments described above has been described as including a single index futures contract 24 and a defined amount of cash 20, other arrangements are possible. For example, the creation unit 20 could include a blend of multiple, different index futures contracts.

Figure 11:
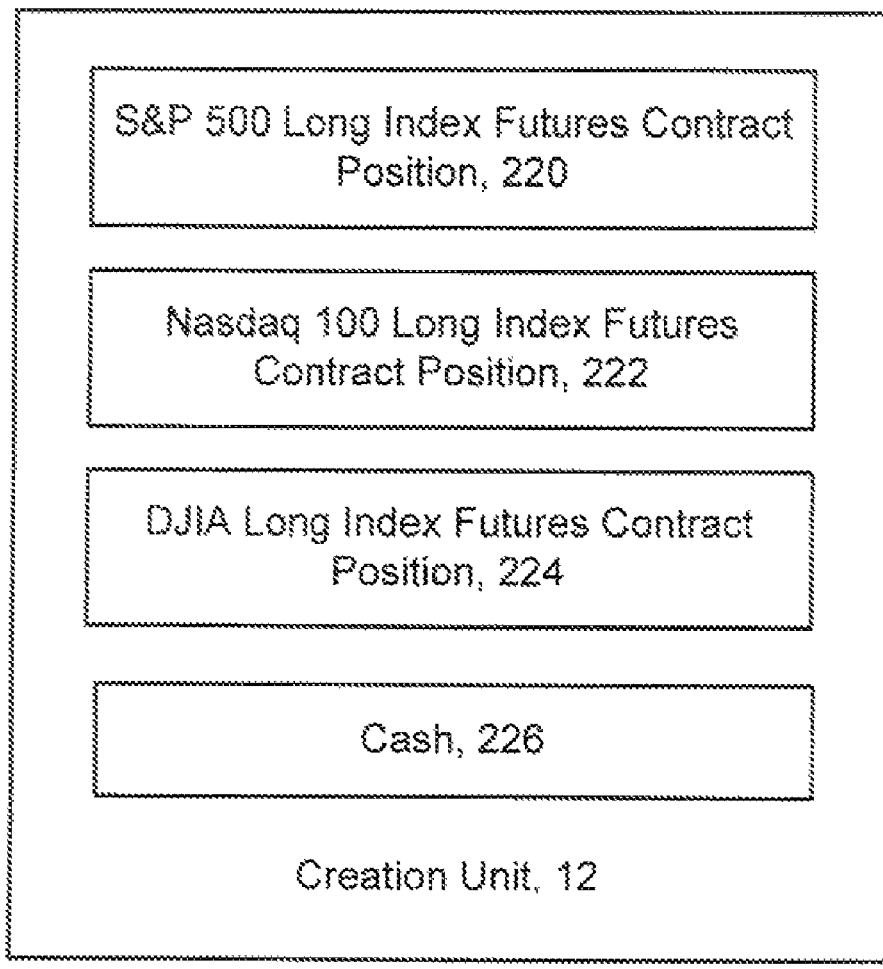
FIG. 11 is a block diagram depicting a creation unit.

Referring to FIG. 11, in one particular example, the creation unit 20 includes weighted amounts of each of the S&P 500 index futures, the Nasdaq 100 index futures, and the Dow Jones Industrial Average (DJIA) futures. As shown in FIG. 11, the creation unit 20 includes one S&P 500 long index futures contract 220, one Nasdaq 100 long index futures contract 222, and one Dow Jones Industrial Average (DJIA) long index futures contract 224. The creation unit also includes a predetermined amount of cash 226. Upon formation of the creation unit 20, the value of the cash 226 would be a sum of the initial mark price for the S&P 500 long index futures contract 220, the initial mark price for Nasdaq 100 long index futures contract 222, and the initial mark price for Dow Jones Industrial Average (DJIA) long index futures contract 224. Upon settlement, the value of the creation unit 20 will converge to the sum of the value of the S&P 500, Nasdaq 100, and DJIA, after accounting for index multipliers in the creation unit and accrued interest on the cash held in the creation unit.

Index Participation Notes based on a blend of different index futures could also be based on particular regions (e.g., Europe, Asia, South America) or on particular types of indexes (e.g., indexes devoted to sectors, or indexes that have different weightings such as capitalization weighted stock indexes, price weighted stock indexes equal weighted stock indexes, and so forth).

Magnified Index Participation Note

Figure 12:
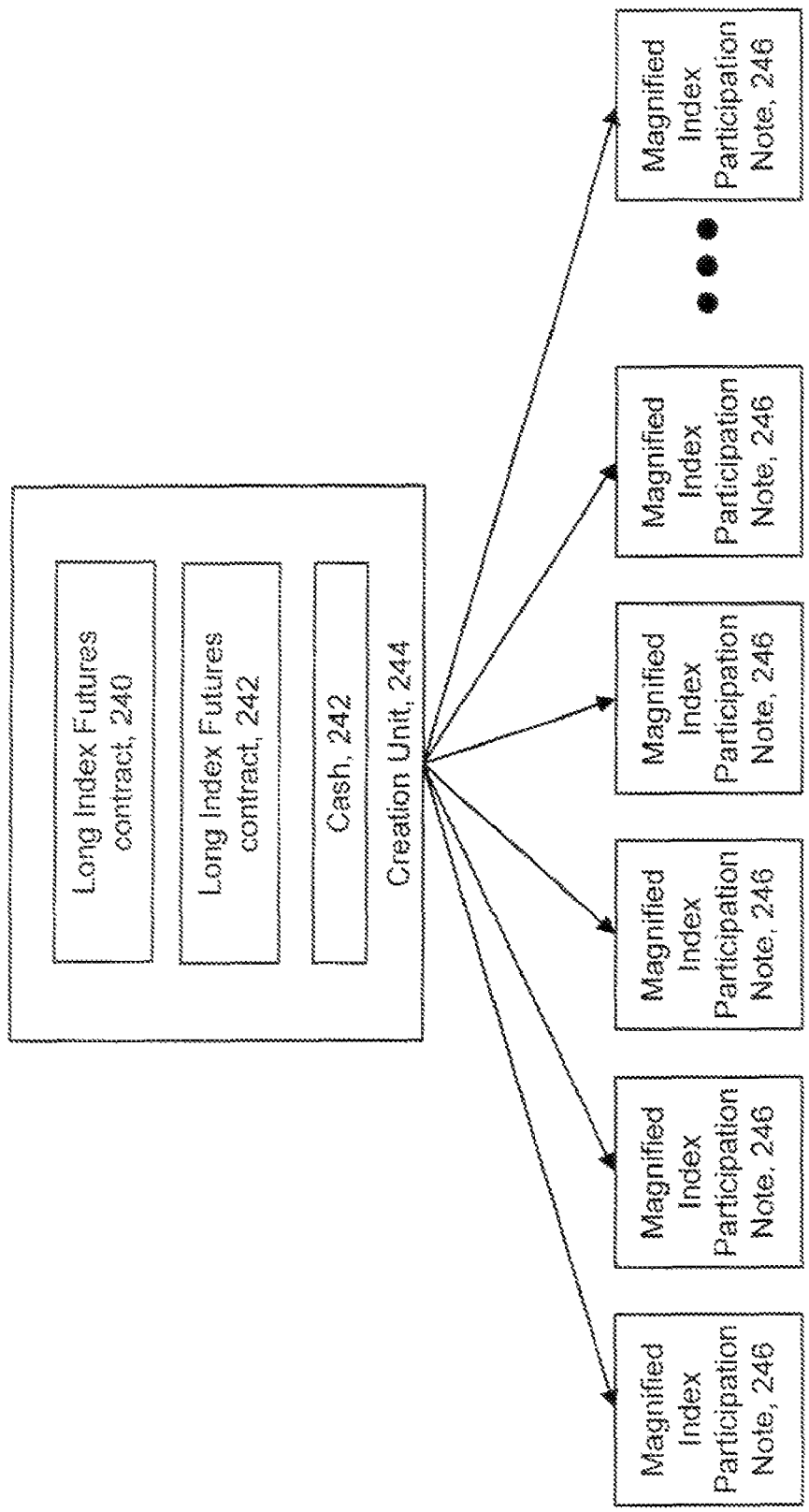
FIG. 12 is a block diagram of a creation unit and multiple Index Participation Notes.

Referring to FIG. 12, an alternative embodiment of a creation unit 244 includes multiple index futures contracts (e.g., long index futures contract 240 and long index futures contract 242) based on the same index. The amount of cash is equal to the mark price of a single futures contract. For example, if long index futures contracts 240 and 242 each have a mark price of $1500, upon generation of the creation unit 244 the amount of cash 242 would be $1500. Including multiple index futures contracts 240 and 242 in the creation unit 244 increases the leverage of the Index Participation Note 246 by magnifying the position taken by the long index futures contract. for example, with the single index futures contract embodiment described above, the resulting creation unit is based on a single futures contract and the mark price of the single contract and when the value of the index futures increases by 1% the value of the Index Participation Notes 22 increases by 1%. Whereas, when the creation unit 244 includes two long index futures contracts 240 and 242 and the cash 242 in the creation unit 244 is equal to the mark price of one of the two index futures contracts, when the value of the index futures increases by 1% the value of the Index Participation Notes 246 increases by about 2% (correspondingly when the value falls by 1% for the futures contract the value falls by about 2% for the Index Participation Note 246). Thus, the number of long futures contracts included in the creation unit 244 serves as a multiplier to the gains/losses incurred by the magnified Index Participation Notes 246.

The number of index futures contracts in the creation unit 244 for the magnified Index Participation Notes 246 can vary. For example, the Index Participation Note issuer could issue magnified Index Participation Notes 246 with between two and ten index futures contracts included in the creation unit 244. If the creation unit 244 includes ten long index futures contracts, a one percent increase in the value of the futures contract would generate a corresponding ten percent increase in the value of the magnified Index Participation Notes 246.

Creation and Redemption Arbitrage

In some embodiments, issuance and subsequent trading of the Index Participation Notes 22 may result in the Index Participation Notes (e.g., Index Participation Notes 22) trading at a slight premium or discount to the futures contracts. When the Index Participation Notes 22 are trading at a slight premium or discount, an arbitrageur could use the situation to arbitrage based on the premium or discount.

If the Index Participation Notes 22 are trading at a premium to the futures contracts 18, the arbitrageur can make money using a creation arbitrage scenario. For example, if Index Participation Notes with a 2006 settlement date are trading at a premium to the index futures with the same settlement date an arbitrage scenario exists. The arbitrageur sells one creation unit worth of 2006 Index Participation Notes at the premium price on a stock exchange and buys one futures contract at the discount price to lock in the price differential. The arbitrageur requests a creation of one creation unit of newly-issued 2006 Index Participation Notes from the Index Participation Note-issuer and delivers out (via clearing house transfer) an open futures position plus cash to the Index Participation Note-issuer. The arbitrageur receives one creation unit of 2006 Index Participation Notes from the Index Participation Note-issuer to cover the sale on the stock exchange on T+3 settlement and also receives more than enough proceeds from the sale of the Index Participation Notes on T+3 settlement to cover the cash delivery to the Index Participation Note issuer for the creation with the excess cash proceeds corresponding to the arbitrages profit from the creation transaction. Thus, as shown above, if the Index Participation Notes are trading at a premium to the futures contracts, the arbitrageur can make money off the difference in price.

Conversely, if the Index Participation Notes are trading at a discount to the futures contracts, the arbitrageur can make money using a redemption arbitrage scenario. For example, if Index Participation Notes with a 2006 settlement date are trading at a discount to the index futures with the same settlement date, an arbitrage scenario exists. The arbitrageur buys one creation unit of the 2006 Index Participation Notes at the discount price on the stock exchange and sells one futures contract at the premium price to lock in differential. The arbitrageur requests redemption of one creation unit of the 2006 Index Participation Notes from Index Participation Note-issuer and receives in (via a clearing house transfer) an open long futures position plus more than enough cash from the Index Participation Note-issuer to cover the purchase of the Index Participation Notes, with the excess cash corresponding to the arbitrage profit from the redemption transaction. The arbitrager delivers one creation unit of 2006 Index Participation Notes to the Index Participation Note-issuer to effect the in-kind redemption of the Index Participation Notes.

Creation Unit Including Short Index Futures Contracts (Bear Index Participation Note)

Figure 13:
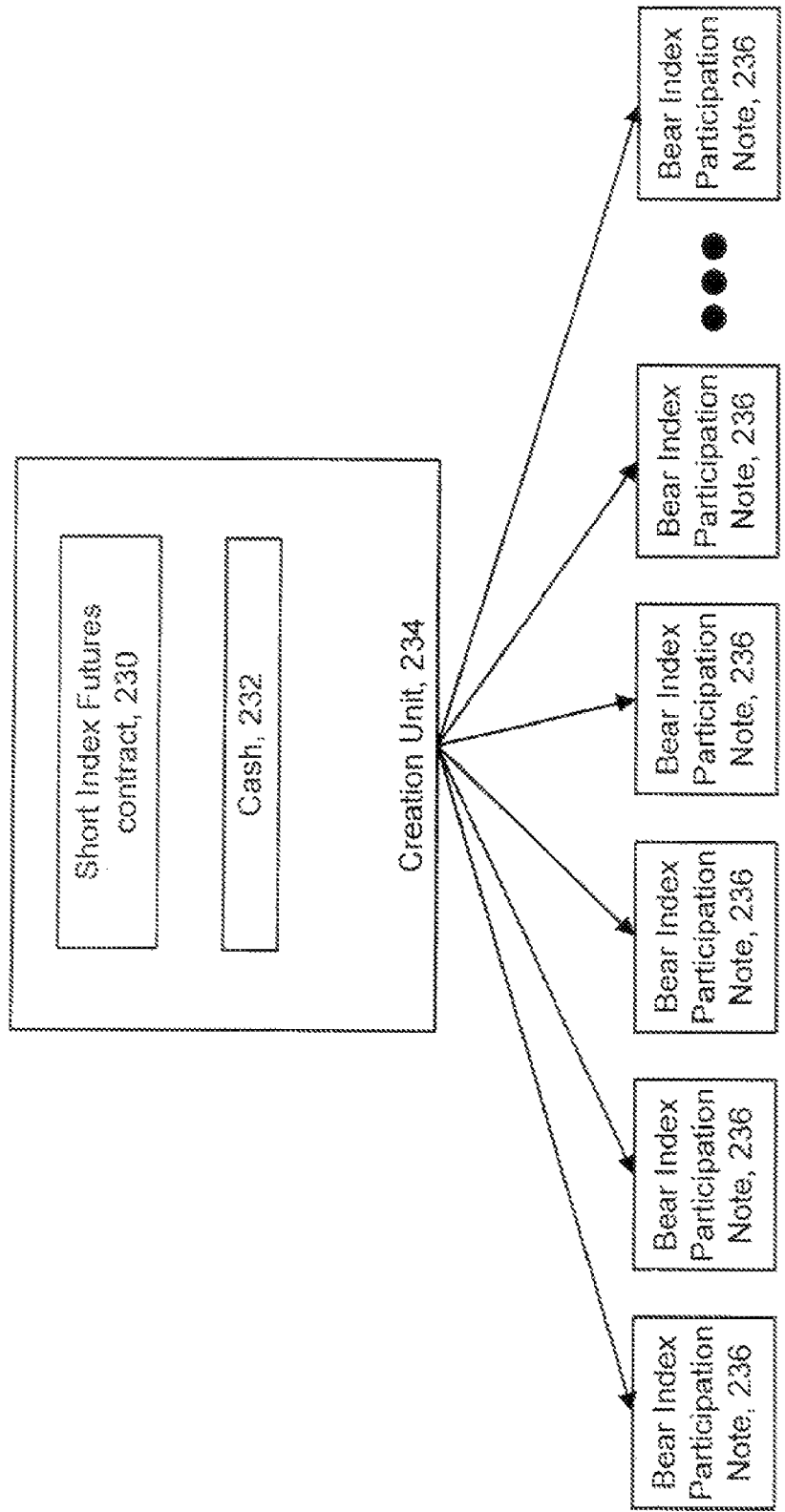
FIG. 13 is a block diagram of a creation unit and multiple Index Participation Notes.

Referring to FIG. 13, while in the examples described above the creation unit (e.g., creation unit 20 or creation unit 244) included long index futures contract(s) in some embodiments a creation unit 234 can include a short index futures contract 230. In order to form the creation unit 234, the Index Participation Note issuer accepts a short index futures contract plus cash from an Index Participation Note creator in exchange for the issuance of Bear Index Participation Notes. The credit to the future clearing margin account on a short index futures position corresponds to the original futures mark price minus the sport price (e.g., the index value) at maturity of the short index futures contract. Such Index Participation Notes issued based on a creation unit 234, (a short futures contract) are referred to herein as "bear" Index Participation Notes 236 because their performance will have an inverse relationship to the performance of the index. Thus, if the index decreases below its initial mark price the value of the bear Index Participation Notes 236 increases because short futures positions are credited with cash as the futures mark goes down and if the index increases the value of the bear Index Participation Notes 236 decreases because short futures positions are debited as the futures mark goes up.

The creation unit 234 also includes a pre-defined amount of cash 232. Since the price of the index futures contract 230 and the cash 232 are guaranteed to converge to the index value on the final settlement date of the futures contract 230, the cash value 232 included in the creation unit 234 upon generation of the bear Index Participation Notes 236 can be calculated by a computer system to account for the inverse relation between the index value and the Index Participation Note value.

Balanced-Asset Futures Based Index Participation Notes

In some embodiments, investment instruments other than index based futures contracts can be included in a creation unit and used to generate Index Participation Notes. For example, a creation unit could blend futures contracts for diversified asset exposure in pre-determined, weighted amounts between stocks, bonds, currencies, and/or other assets underlying futures contracts, provided such futures contrasts are cash settled in the manner previously described.

Index Options-Based Index Participation Notes

Figure 14:
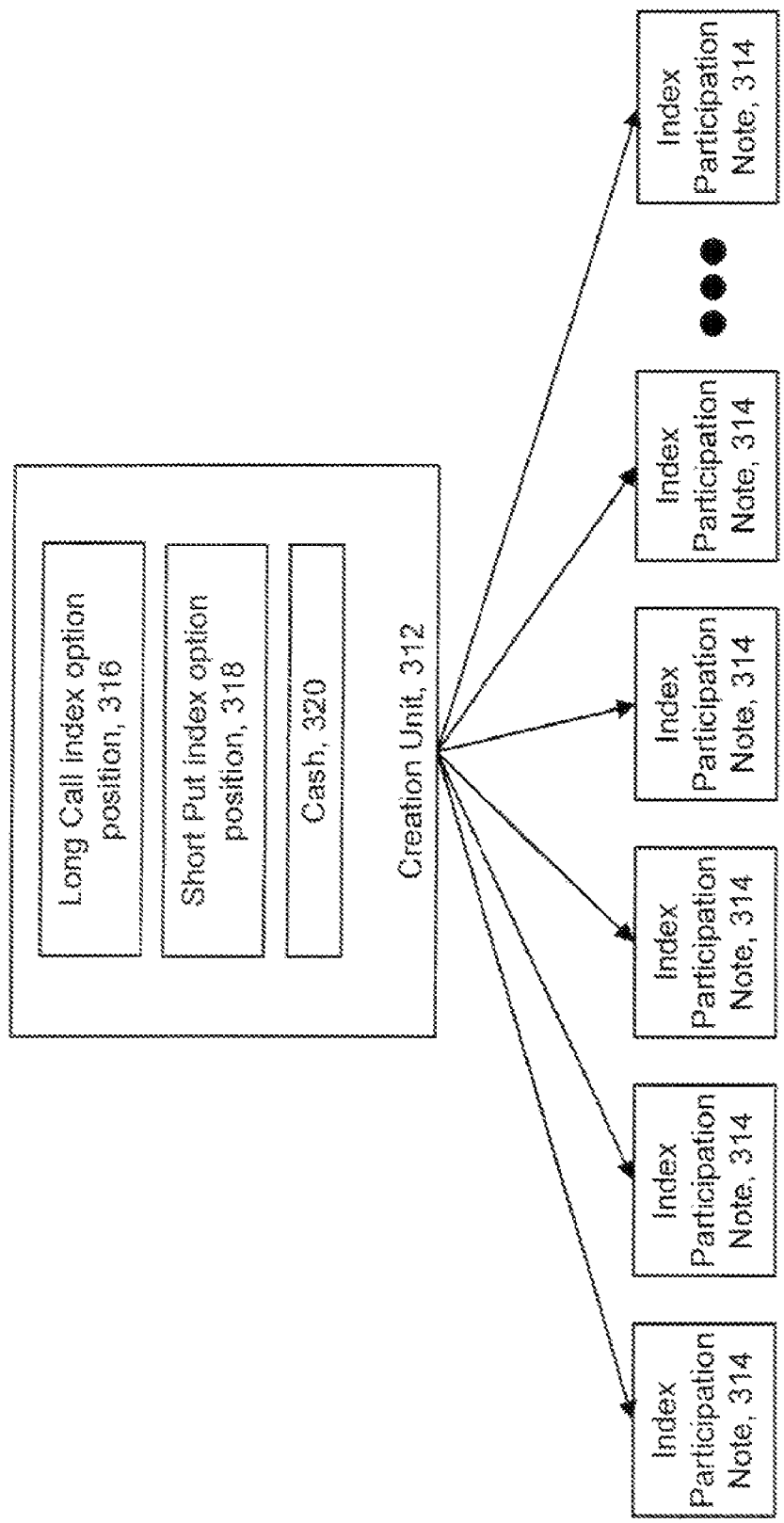
FIG. 14 is a block diagram of a creation unit and multiple Index Participation Notes.

Referring to FIG. 14, an alternative embodiment of Index Participation Notes 314 has an Index Participation Note issuer issuing Index Participation Notes 314 that are backed by a call and put option positions on a particular index of securities. The Index Participation Notes 314 are tradable index shares that are backed by a fractional interest in a long call index option position 316, a short put index options position 318, and a defined amount of cash 320 all of which are included in a creation unit 312.

Each creation unit 312 is divided into multiple Index Participation Notes 314. For example, creation unit 312 can be partitioned into 100 Index Participation Notes 314, such that each Index Participation Note 314 represents a ¹⁄₁₀₀th ownership interest in the index long call and short put options positions 316 and 318 and a ¹⁄₁₀₀th ownership interest in the cash 320 included in the creation unit 312. Other partitions in the creation unit 312 into other amounts of Index Participation Notes 22 are possible. In some embodiments, each creation unit is divided into from about 100 to about 10,000 Index Participation Notes 22.

Index options contracts such as the long call index option position 316 and the short put index option position 318 are call/put options based on a stock market index such as the S&P 500® or the Nasdaq 100®, which be European exercised (i.e., exercised on expiration) or American exercised (i.e., exercisable on or before the expiration date). In contrast to stock options, index options do not require the writer of a call option to actually deliver shares of the stocks included in the index upon exercise of the option or the put writer to actually purchase the shares of stock included in the index upon exercise of the option. Rather, the index options are based on a cash settlement procedure. The payoff that would be due if the option were exercised is calculated and, upon exercise of an option, the option writer pays the calculated amount to the holder of the option.

The long call index option position 316 included in the creation unit 312 gives the holder of the position (e.g., the note issuer 310) the economic benefit of the amount by which the index value exceeds the strike price on the option expiration date. thus, if the index increases in value above the strike price, the Index Participation Note increases in value. On the other hand, the short, put index option position 318 gives the holder of the short position the economic benefit of the amount by which the index value falls short of the strike price on the option expiration date. Thus, if the index decreases in value, the Index Participation Note 310 decreases in value.

A computer system calculates the amount of cash 320 included in the creation unit 312. In general, the amount of cash 320 equals the option strike price times a contract multiplier. If the cash 320 is held in an interest bearing account, the computer system calculates the total value of the cash 320 in the creation unit 312 on any day after creation to reflect principal value plus accrued interest.

Figure 15:
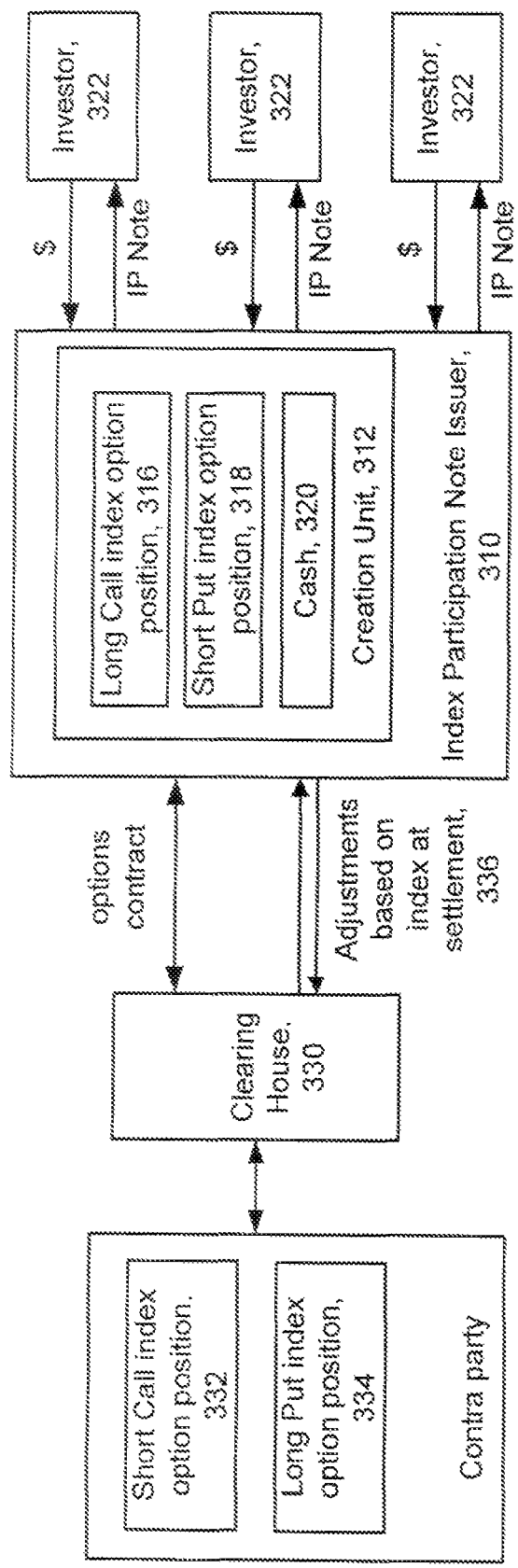
FIG. 15 is a block diagram depicting relationships among entities.

Referring to FIG. 15, in order to facilitate creation of Index Participation Notes 314, long call and short put options positions 316 and 318 are established by an investor seeking to generate Index Participation Notes and transferred with a requisite cash amount via a clearing house 330 to the Index Participation Note issuer 310 in exchange for the newly issued Index Participation Notes. The Index Participation Note issuer 310 receives, the long call options positions 316 and the short put index options positions 318 plus cash through accounts at the clearing house 330. Thus, the Index Participation Note issuer 310 will have an increase in value in the options and cash positions if the index rises in value and will have a decrease in value if the index decreased in value by the expiration date.

Both the long call and short put index options positions 316 and 318 are established based on the same "strike price" for the options contracts. On the expiration date for the options contracts, if the value of the index is greater than the strike price, money is transferred from the clearing house 330 to the Index Participation Note issuer 310 (as indicated by arrows 336 and described below in relation to FIGS. 16-18). Conversely, on the expiration date for the options contracts, if the value of the index is less than the strike price, money is transferred from the Index Participation Note issuer 310 to the clearing house 330.

After the options positions 316, 318, 332, and 334 and cash have been delivered via the clearing house 330 to the Index Participation Note issuer 310, the Index Participation Note issuer 310 produces a creation unit 312. As described above, the creation unit 312 holds a long, call and a short put index options positions 316 and 318 and a predefined amount of cash 320. The amount of cash 320 included in the creation unit 312 equals the strike price for the options contracts 316 and 318 multiplied by a contract multiplier (if applicable). For example, if the strike price for the long call index option position 316 is $1000 and the strike price for the short put index options contract 318 is $1000 upon formation the creation unit would include $1000 multiplied by the contract multiplier (if any) for the options contracts.

Initially, upon the first generation of particular Index Participation Notes, the Index Participation Notes are valued based on the cash amount related to the pro-rata cash 320 in the creation unit 312 and the market price of the options contracts 316 and 318 at the time of first generation of the Index Participation Notes 314 after accounting for expenses and fees. Thus, the cost of the Index Participation Note 314 is initially based on the strike price of the options contracts 316 and 318 for the index on the day of formation of the creation unit 312. If additional Index Participation Notes 314 are issued to investors 322 after the initial creation unit, a computer system calculates the amount of cash necessary to form a creation unit 312. The amount of cash will include any accrued interest such that the formation of the additional Index Participation Notes 314 does not dilute the value of the previously offered Index Participation Notes 314.

After issuance of the Index Participation Note 314 by the Index Participation Note issuer 310, the Index Participation Note 314 can be traded on an exchange, market, electronic communication network (ECN) and other trading venues. In order to facilitate open trading of the Index Participation Notes 314, the Index Participation Notes 314 can be listed and traded like ordinary shares of stock or exchange traded funds (ETFs) on one or more national securities exchanges and/or through the trading facilities of one or more electronic communication networks (ECNS).

Secondary market trading of Index Participation Notes 314 will be at prices governed by competitive supply and demand forces taking into consideration the values of the index options contracts, cash, and value of the index that the Index Participation Notes 314 represent. Since the Index Participation Notes 314 are traded in a manner similar to traditional stocks on a national securities exchange, the Index Participation Notes 314 will be available to be traded and held through any ordinary stock brokerage account and handled by any one of the Registered Representatives in the United States today.

Since the creation unit 312 includes a long call option 316, a short put option 318, and a defined amount of cash 320 corresponding to the strike price of the options, the value of the Index Participation Note 314 converges to the value of the underlying index on the expiration date of the index options contracts 316 and 318. With this arrangement the investment position represented by the Index Participation Note 314 is economically equivalent to being long on the basket of stocks included in the index regardless of whether the index increases or decreases in value. In order for the value of the Index Participation Notes 314 to converge to the index on the settlement date, the strike price of the long call option 316 and the short put option 318 must be the same.

For an index call option, the payoff to a holder of an index call option is:

| | |
|---|---|
| V − S | if V > s |
| 0 | if V = S |
| 0 | if V < S | where V is the value of the index at expiration of the index call option and S is the strike price for the index call option.

For a put index option, the payoff to a holder of the put index option is:

| | |
|---|---|
| 0 | if V > s |
| 0 | if V = S |
| S − V | if V < S | where V is the value of the index at expiration of the option and S is the strike price for the option. Since the Index Participation Note issuer 314 is short the put option, the Index Participation Note issuer 314 will be liable for payment of S-V should the value of the index be less than the strike price on settlement date. Thus, the net gains/losses credited to or debited against the cash value of the creation unit are as follows:

| | |
|---|---|
| +(V − S) | if V > s |
| 0 | if V = S |
| −(S − V) | if V < S |

Since the creation unit 312 includes cash equal to the strike price 'S', the value of the creation unit converges to the value of the index 'V.' That is, regardless of whether 'V' is greater than 'S', equal to 'S' or less than 'S' on expiration date, the value of the account holding the long call, short put, and cash equal to the strike price equals 'V' value of the index.

Figure 16:
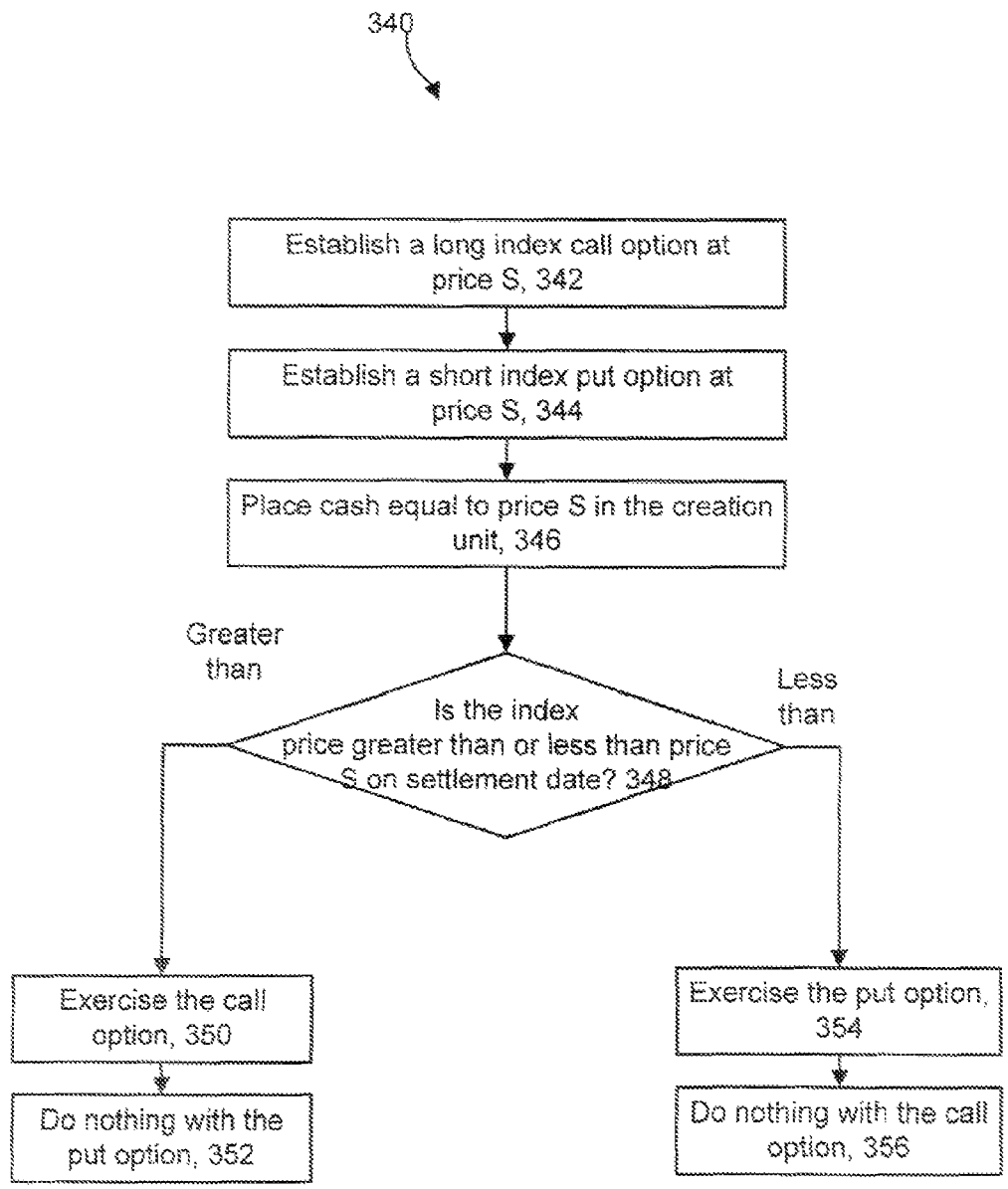
FIG. 16 is a flow chart of a settlement process.

Referring to FIG. 16, a process 340 for issuing and redeeming Index Participation Notes based on options contracts is shown. The Index Participation Note issuer 310 receives a long index call option having a particular strike price, referred to herein as strike price 'S' (342) and receives a short index put option having the same strike price 'S' (344). The Index Participation Note issuer 310 also receives an amount of cash equal to the strike price 'S' in the creation unit 312 (346). Since the strike prices 'S' of the long call and short put options positions are the same and the creation unit 312 includes cash 320 equal to the strike price 'S', the value of the creation unit 312 converges to the value of the index on the date of expiration after accounting for the index multiplier.

As the value of the creation unit converges to the index, on the expiration date, the Index Participation Note issuer 310 uses a computer system to administer, monitor, and reconcile cash flows depending on whether the index price is greater than, equal to, or less than the strike price 'S' (348). For example, if the index value is greater than the strike price on expiration date, the Index Participation Note issuer exercises the call option (350) and the put option (352) is not exercised. Conversely, if the index value is less than the strike price 'S' on expiration date, the put option is exercised by its holder (354) against the Index Participation Note issuer 310 while the call option (356) is not exercised. The computer system adjusts the amount of cash included in the creation unit 312 based on the exercised options and exercised settlement values. Examples are presented below in relation to FIGS. 17A, 17B, 18A, and 18B.

Figure 17A:
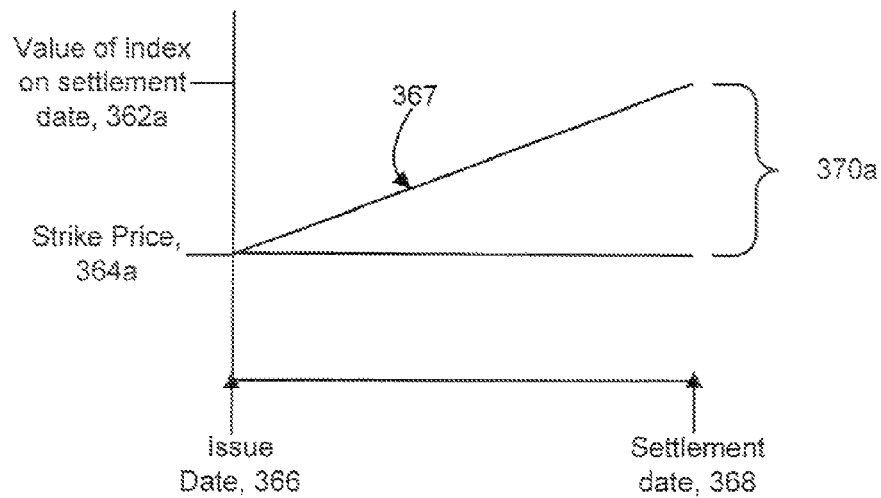
FIG. 17A is a diagram of changes in the value of an index versus time.
Figure 17B:
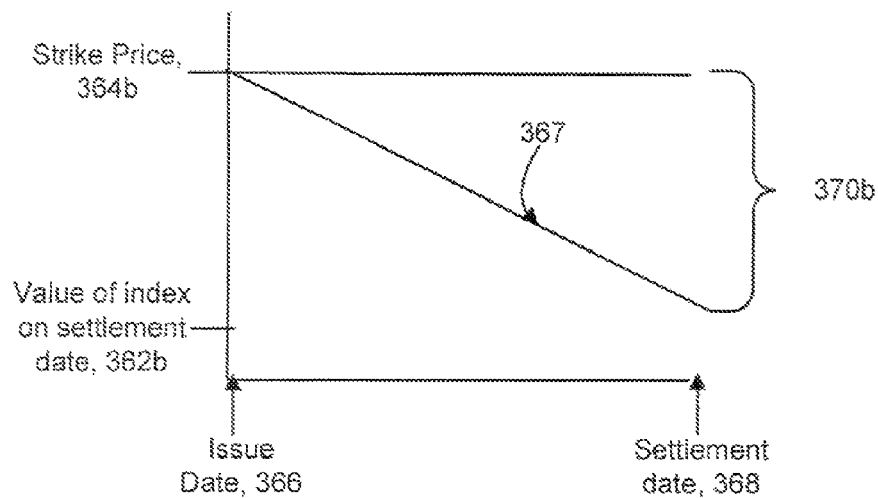
FIG. 17B is a diagram of changes in the value of an index versus time.

FIGS. 17A and 17B depict examples of the convergence of the value of the creation unit 312 and the index after accounting for the index multiplier when the strike price for the options contracts 316 and 318 is the same as the value of the index on the date of generation of the creation unit 312.

Referring to FIG. 17A, an example if depicted in which the strike price 364a is equal to the value of the index on the issue date 366. In this example, the value of the index (represented by line 367) rises between the issue date 366 and the expiration date 368. At the expiration date 368, the value of the index is greater than the strike price of the options contract. Thus, the call option has a payout 370a of the index value minus the strike price and the put option expires worthless (i.e., has a value of $0). Therefore, the sum of the cash 320 in the creation unit 312 (e.g., the strike price plus the payout 370a from the call option) converges to the value of the index upon settlement.

Referring to FIG. 17B, the strike price 364b is equal to the value of the index on the issue date 366. In this example the value of the index (represented by line 367) decreases between the issue date 366 and the settlement date 368. At the settlement date 368, the strike price 364b of the options contracts is greater than the value of the index 362b. Thus, the call option expires worthless (i.e., has a value of $0), and since the Index Participation Note issuer 310 holds a short put option 318, the Index Participation Note issuer 310 pays the buyer of the option a payout 370b equal to the strike price minus the index value. The sum of the cash 320 in the creation unit 312 (e.g., the strike price minus the payout 370b paid from the put option) converges to the value of the index on the settlement date 368.

Figure 18A:
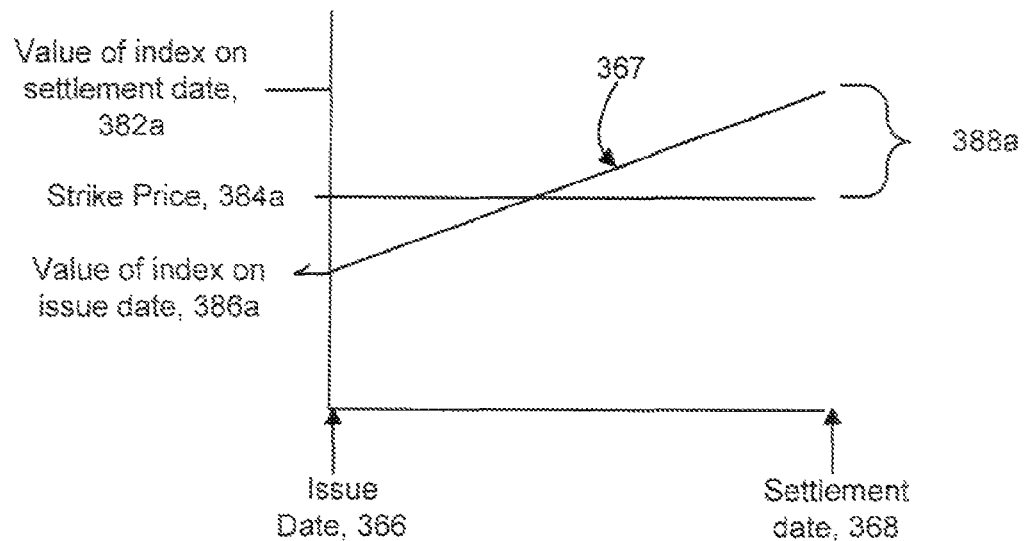
FIG. 18A is a diagram of changes in the value of an index versus time.
Figure 18B:
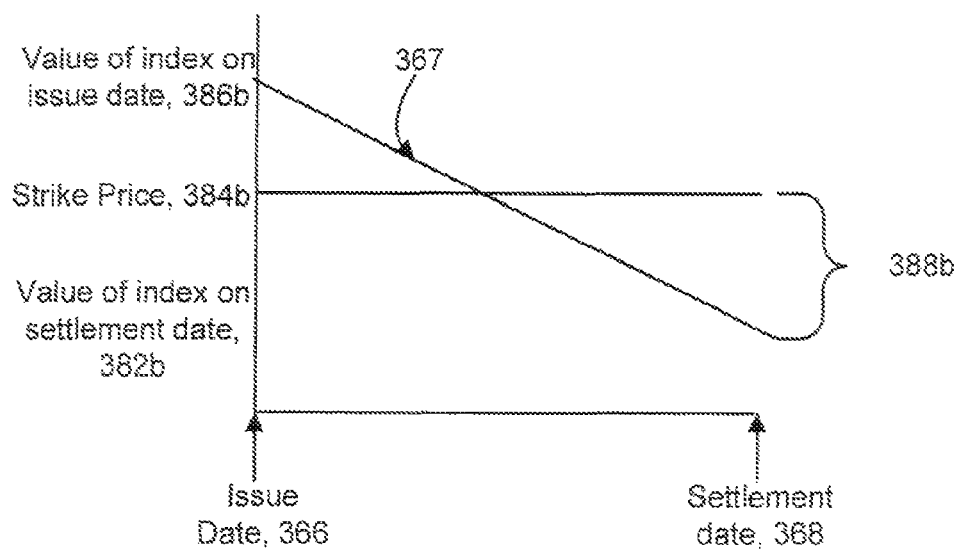
FIG. 18B is a diagram of changes in the value of an index versus time.

FIGS. 18A and 18B depict examples of the convergence of the value of the creation unit 312 and the index when the strike price for the options contracts 316 and 318 is different from the value of the index on the date of generation of the creation unit 312 are shown.

Referring to FIG. 18A, in this example the strike price 384a is different from the value of the index 386a on the issue date 366. In this example the value of the index (represented by line 367) rises between the issue date 366 and the settlement date 368. At the settlement date 368, the strike price 384a of the options contracts is less than the value of the index 382a. Thus, the put option expires worthless and has a value of $0 (and thus the Index Participation Note issuer 310 as the seller of the put option does not owe any money to the buyer) and the call option has a payout 388a of the index value minus the strike price. Thus, the sum of the cash 320 in the creation unit 312 (e.g., the strike price plus the profit 388a from the call option) is the value of the index 382a.

Referring to FIG. 18B, in this example the strike price 384b is different from the value of the index 386b on the issue date 366. In this example the value of the index (represented by line 367) decreases between the issue date 366 and the settlement date 368. At the settlement date 368, the strike price of the options contracts is greater than the value of the index 382b. Thus, the call option expires worthless and has a payout of $0. Since the Index Participation Note issuer 310 is short the put option, the Index Participation Note issuer pays the buyer of the option a payout 388b equal to the strike price 384b minus the index value 382b. Thus, again, the sum of the cash 320 in the creation unit (e.g., the strike price minus the payment 388b paid from the put option) converges to the value of the index 382b on the settlement date 368.

As shown in the examples above, in order for the value of the options 316 and 318 and the cash 320 included in creation unit 312 to converge to the value of the index on the expiration date the options have the same strike price and the amount of cash 320 included in the creation unit 312 is equal to that strike price. However, at any given time there are multiple options available on the market with the same expiration date but different strike prices.

Figure 19:
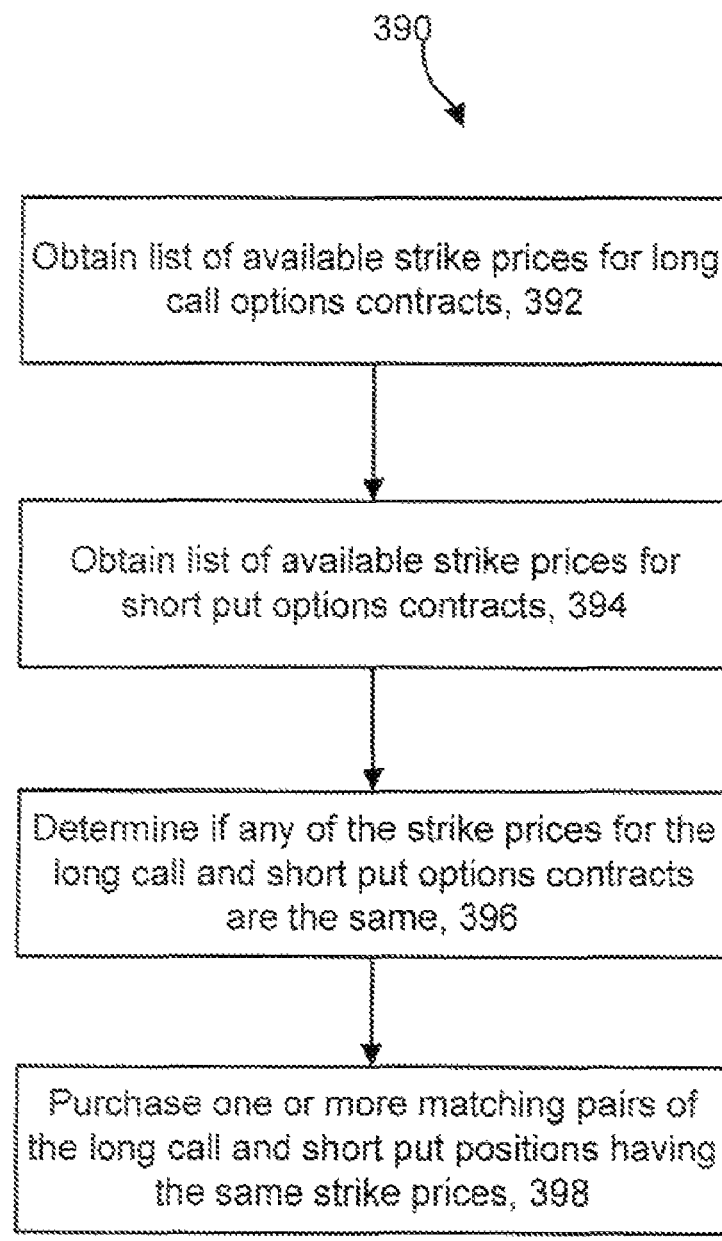
FIG. 19 is a flow chart of an options strike price matching process.

Referring to FIG. 19, a process 390 for obtaining long call index option contracts 316 and short put index options contracts 318 having the same strike price and settlement date is shown. the Index Participation Note issuer 310 uses a computer to obtain a list of available strike prices for call index options 316 having a particular settlement date (392) and to obtain a list of available strike prices for put index options 318 having the same settlement date (394). The computer system determines if any of the strike prices for a long call option contract and a short put option contract are the same (396). If at least some matching strike prices are located, the computer system instructs the Index Participation Note issuer 310 to accept one or more of the matching pairs of long call and short put index options having the same strike price and the same expiration date in the creation unit in exchange for newly issued Index Participation Notes (398).

Figure 20:
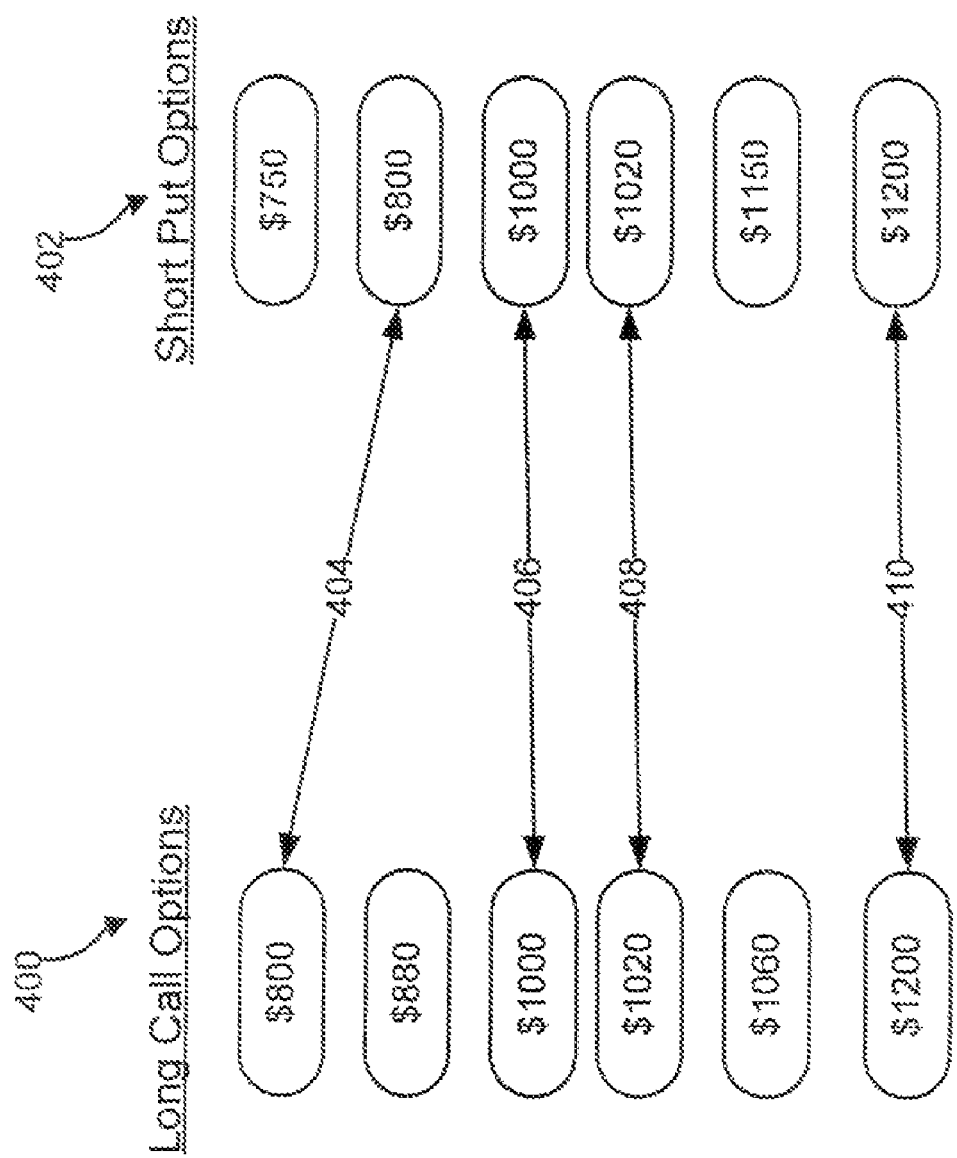
FIG. 20 is a block diagram of long call and short put index options strike prices.

Referring to FIG. 20, an exemplary listing of strike prices for long call and short put index options is shown. The long call options (shown in column 400) include long call index options having strike prices of $800, $880, $1000, $1020, $1060, and $1200. The short put index options (shown in column 402) include short put index options having strike prices of $750, $800, $1000, $1020, $1150, and $1200. In order to determine the matching pairs of index options, the computer system obtains both of these lists. After analyzing the strike prices, the computer system would determine that matching pairs exist at the strike prices of $800, $1000, $1020, and $1200 (as indicated by arrows 404, 406, 408, and 410, respectively). The Index Participation Note issuer 310 receives one or more long call and short put index options pairs having the same strike price and expiration date to provide a creation unit basis for issuance of Index Participation Notes 314.

Figure 21:
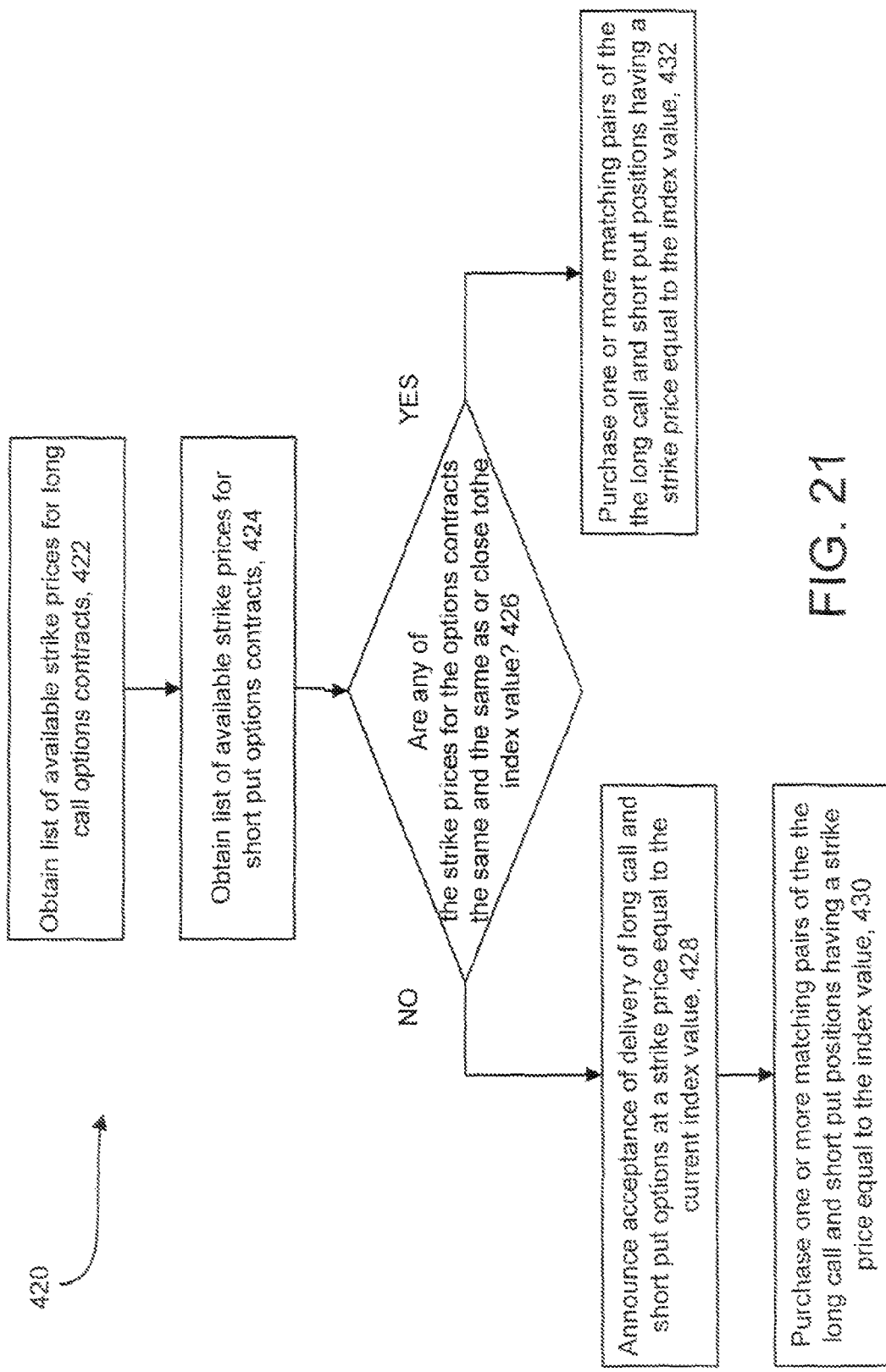
FIG. 21 is a flow chart of an options strike price matching process.

Referring to FIG. 21, a process 420 for obtaining long call index option contracts and short put index options contracts having strike prices equal to the index value at the issue date and having the same settlement date if shown. The Index Participation Note issuer 310 uses a computer system to obtain a list of available strike prices for long call index options having a particular expiration date (422) and to obtain a list of available strike prices for short put index options having the same expiration date (424). The computer system determines if any of the strike prices for the long call and short put options contracts are the same as (or within a certain percentage of) the current value of the index (426). If one or more matching pairs of long call and short put options having a strike price equal to (or about the same as) the index value are located, the computer system instructs the Index Participation Note issuer 310 to accept at least one of the matching pair(s) of long call and short put index options (432). If such matching pairs are not located, the Index Participation Note issuer 310 announces that it will accept delivery of long call and short put options at a strike price equal to the current index value (428). The index note issuer 310 purchases one or more matching pairs of the long call and short put options (430).

Figure 22:
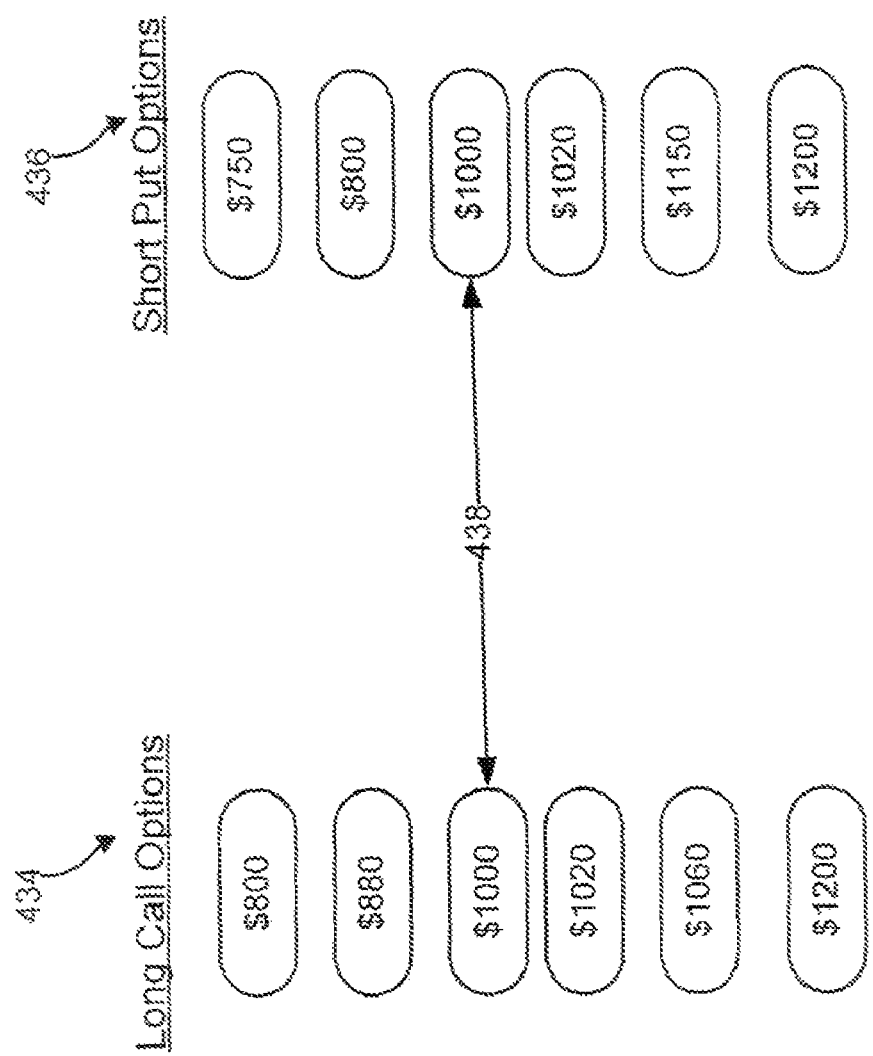
FIG. 22 is a block diagram of long call and short put index options strike prices.

Referring to FIG. 22, an exemplary listing of strike prices for long call and short put index options is shown. The long call options (shown in column 434) include long call index options having strike prices of $800, $880, $1000, $1020, $1060, and $1200. The short put index options (shown in column 436) include short put index options having strike prices of $750, $800, $1000, $1020, $1150, and $1200. If the current index value was $1000, the computer system analyzes the lists 434 and 436 and determines that a matching pair of long call and short put index options exist at a strike price equal to the value of the index, namely a strike price of $1000 (as indicated by arrow 438). The Index Participation Note issuer 310 purchases the long call and short put index options having the same strike price.

While in the examples described above the long call and short put options included in the creation unit 310 had the same strike price, in some embodiments the long call and short put options included in the creation unit 310 can have different strike prices. In such embodiments, the value of the Index Participation Notes issued based on the creation unit does not necessarily converge to the value of the index on settlement date. In order to guarantee the index value to the holders of the Index Participation Notes, the Index Participation Note issuer 310 uses a computer system to calculate a valuation to determine what amount of cash to include in the creation unit after accounting the difference in value due to differences in strike prices. In order to calculate the valuation, the computer system could determine the amount by which the value of the creation unit would exceed or fall short of the value of the index on expiration date. The computer system would also adjust the cash amount corresponding to strike price and index multiplier to offset the excess value or the shortfall in value in order to ensure the Index Participation Note converges in value with the Index.

While in the examples described above the long call and short put options included in the creation unit 310 had the same expiration date, in some embodiments the long call and short put options included in the creation unit 310 can have different expiration dates. In such embodiments, the value of the Index Participation Notes issued based on the creation unit does not necessarily converge to the value of the index on settlement date. In order to guarantee the index value to the holders of the Index Participation Notes, the Index Participation Note issuer 310 uses a computer system to calculate a valuation to determine what amount of cash to include in the creation unit after accounting the difference in value due to differences in expiration dates. In order to calculate the valuation, the computer system would determine the amount by which the value of the creation unit would exceed or fall short of the value of the index on expiration date. The computer system would also adjust the cash amount corresponding to strike price and index multiplier to offset the excess value or the shortfall in value in order to ensure the Index Participation Note converges in value with the Index.

Redemption/Settlement of IP Notes

Similar to the situation described above in relation to the Index Participation Notes 22 issued based on a creation unit 20 that includes an index futures contract 24 and a defined amount of cash 20, Index Participation Notes 314 based on long call/short put index options 316 and 318 and cash 320 can have either a fixed term or a variable term.

For Index Participation Notes 314 having a fixed term, the term coincides with the specific monthly or quarterly settlement date of the corresponding index options contracts that are used in the creation unit 312. On the settlement date the Index Participation Notes 314 are liquidated and a pro-rata share of cash is distributed to holders of the Index Participation Notes 314.

For Index Participation Notes 314 having a variable term, holders may exercise a cash-out, e.g., on a quarterly basis. If the holder of the Index Participation Notes 314 elects not to cash-out the Index Participation Notes, the Index Participation Notes 314 are automatically rolled forward into new Index Participation Notes. The new Index Participation Notes are issued through rule-driven market execution by the Index Participation Note-issuer 310. The notes approximately correspond in underlying notational value to the remaining aggregate cash from the liquidated Index Participation Notes held by Index Participation Note-issuer.

In some embodiments, an Index Participation Note holder may redeem Index Participation Notes 314 from the Index Participation Note issuer 310 prior to the settlement date.

If the Index Participation Note holder does not own a creation unit-size aggregation of Index Participation Notes, redemption is not feasible. In such a situation, the Index Participation Note holder can trade, i.e. sell, the Index Participation Notes 314 on an exchange, market or other trading venue obtain a current value for the Index Participation Notes 314 prior to the settlement date.

On the other hand, if the Index Participation Note holder owns a creation unit-size aggregation of Index Participation Notes and requests to redeem the Index Participation Notes 314 prior to settlement of the options contracts, the Index Participation Note issuer 310 uses a computer to calculate the cash value for the creation unit of Index Participation Notes 314. Since the settlement date of the long call and short put options contracts 316 and 318 has not yet arrived, the Index Participation Note issuer 310 transfers the long call and short put options contracts 316 and 318 in the creation unit 312 and the requisite cash value 320 after accounting for any fees to the Index Participation Note holder in exchange for the Index Participation Notes 314.

Creation Unit Including Multiple Long Call and Short Put Index Options

While the creation unit 312 in the embodiments described above has been described as including a long call index option and a short put index option based on a single index, other arrangements are possible. For example, the creation unit 312 could include a blend of options contracts for multiple different indexes.

Figure 23:
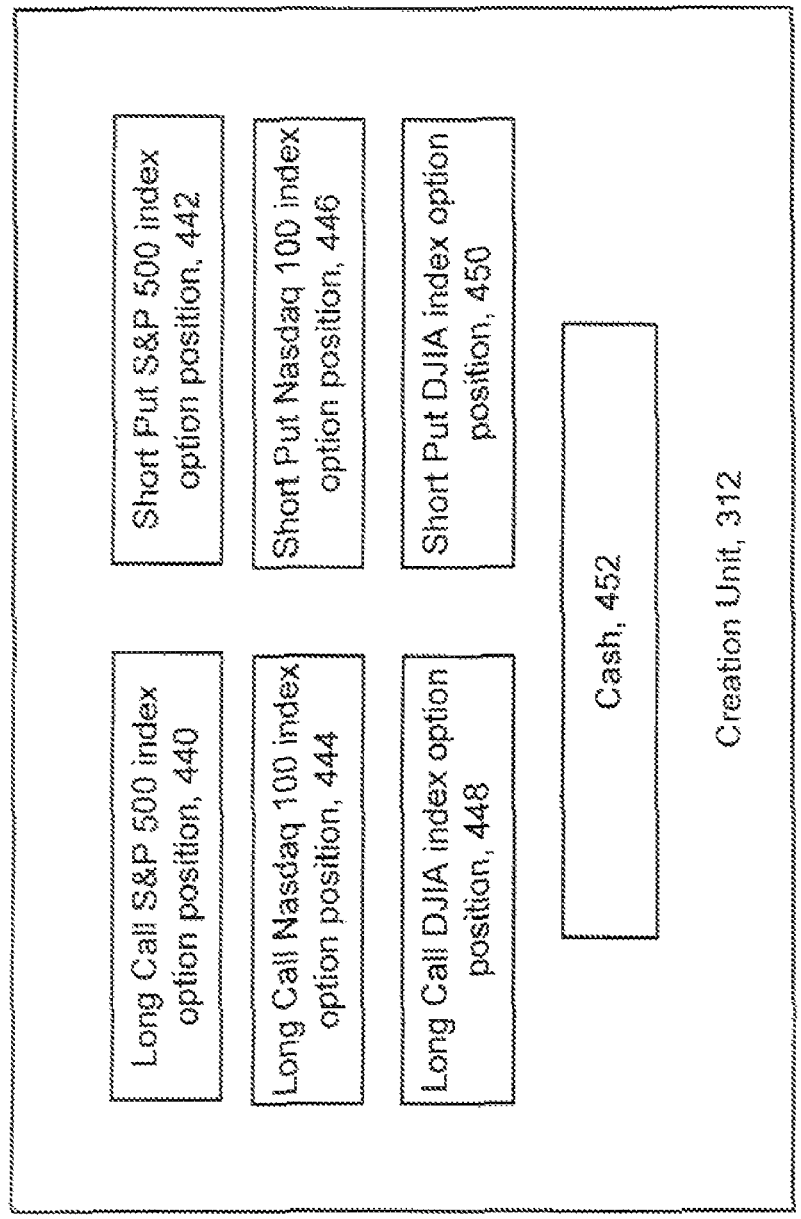
FIG. 23 is a block diagram depicting a creation unit.

In one particular example, as shown in FIG. 23, the creation unit 312 could include weighted amounts of each of the S&P 500 index, the Nasdaq 100 index, and the Dow Jones Industrial Average (DJIA). the creation unit 312 includes an S&P 500 long call index option 440, an S&P 500 short put index option 442, a Nasdaq 100 long call index option 444, a Nasdaq 100 short put index option 446, a Dow Jones Industrial Average (DJIA) long call index option 448, and a DJIA short put index option 450. The creation unit 312 also includes a defined amount of cash 452. Upon formation of the creation unit 312, the value of the cash 452 would be a sum of the strike prices for the S&P 500 options, the Nasdaq 100 options, and the DJIA options after applying the respective index multipliers.

Index Participation Notes based on a blend of different index options could also be based on particular regions (e.g., Europe, Asia, South America) or on particular types of indexes (e.g., indexes devoted to sectors, or indexes that have different weightings such as capitalization weighted stock indexes, price weighted stock indexes equal weighted stock indexes, and so forth).

Creation Unit Including Multiple Index Options Contracts (Magnified IP Note)

Figure 24:
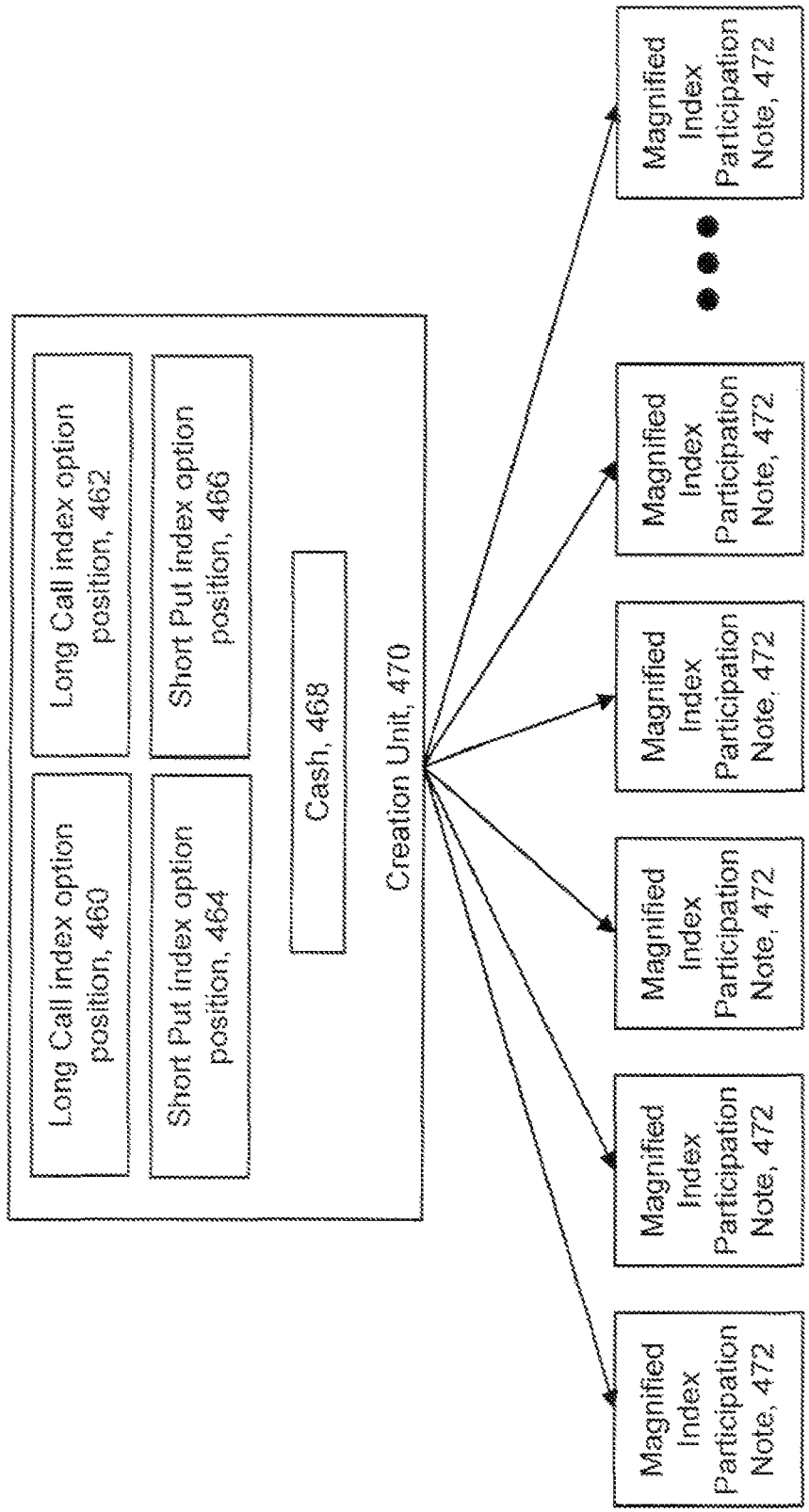
FIG. 24 is a block diagram of a creation unit and multiple Index Participation Notes.

Referring to FIG. 24, in some embodiments, a creation unit 470 can include multiple long, call and multiple short, put index options contracts based on the same index and the same strike price and expiration month. In the example shown in FIG. 24, the creation unit 470 includes two long call index options contracts 460 and 462 and two short put index options contracts 464 and 466. The creation unit 470 also includes a defined amount of cash 468 equal to the strike price of one of the options contracts multiplied by the contract multiplier.

For example, if the options contracts 460, 462, 464, and 466 each have a strike price of $1500, $1500 multiplied by the index multiplier would be included as the cash 468 in the creation unit 470. These multiple index options contracts 460, 462, 464, and 466 increases the leverage of the Index Participation Note by magnifying the position taken by the options contracts.

When the creation unit 470 includes two long cal index options contracts 460 and 462 (in contrast to one as described above) and the cash 468 in the creation unit 470 is the strike price of a single one of the contracts, for each 1% by which the value of the index increases above the strike price by expiration date, the value of the Index Participation Notes 246 increases by about 2%. Similarly, when the creation unit includes two short put index options contracts 464 and 466 (in contrast to one as described above) and the cash 468 in the creation unit 470 is the strike price of a single one of the contracts, for each 1% by which the value of the index decreases below the strike price by expiration date, the value of the magnified Index Participation Notes 472 decreases by about 2%. Thus, the number of long call and short put index options contracts included in the creation unit 470 serves as a multiplier to the gains/losses incurred by the magnified Index Participation Note 472.

The number of index options contracts in the creation unit 470 for the magnified Index Participation Notes 472 can vary. For example, the Index Participation Note issuer 310 could issue magnified Index Participation Notes 472 with between two and twenty long call and short put index options contracts included in the creation unit 470. By way of illustration, if the creation unit 470 includes ten long call and short put options contracts, a one percent increase in the value of the index above strike price on expiration date would generate a corresponding ten percent increase (approximately) in the value of the creation unit 470 above the strike price on which the magnified Index Participation Notes 472 are based on expiration date.

While in the above example, the magnified Index Participation Note provides a multiply enlarged return based on a change in the value of the index, in some embodiments a magnified Index Participation Note provides a multiply enlarged return if the opposite of the movement of the value of the index. For example, for each 1% by which the value of the index decreases below the strike price by expiration date, the value of the Index Participation Notes increases by about 2%. Similarly, in some embodiments, for each 1% by which the value of the index increases below the strike price by expiration date, the value of the magnified Index Participation Notes increases by about 2%. Thus, the number of short call and long put index options contracts included in the creation unit serves as a multiplier to the gains/losses incurred by the magnified Index Participation Note.

The number of index options contracts in the creation unit for the magnified bear Index Participation Notes can vary. For example, the Index Participation Note issuer 310 could issue magnified bear Index Participation Notes 472 with between two and twenty long put and short call index options contracts included in the creation unit 470.

Creation and Redemption Arbitrage

In some embodiments, issuance and subsequent trading of the Index Participation Notes 314 may result in the Index Participation Notes trading at a slight premium or discount to the options contracts. When the Index Participation Notes are trading at a slight premium or discount, an arbitrageur could use the situation to arbitrage based on the premium or discount.

If the Index Participation Notes are trading at above the value corresponding to the current 2006 Index call options premium minus the current 2006 Index put options premium plus the cash amount equal to the options contract strike price times the contract multiplier, an opportunity for creation unit arbitrage exists. In this situation, the arbitrageur would sell one creation unit worth of 2006 Index Participation Notes at the premium price on the exchange, market or other trading venue and buy one 2006 index call option contract, and sell one 2006 index put option contract to lock in the differential in the values of the Index Participation Notes and the value of the creation unit composed of the long 2006 Index call options and short 2006 Index put options.

The arbitrageur would request the creation of one creation unit of newly-issued 2006 Index Participation Notes from the Index Participation Note-Issuer. The arbitrageur would deliver out (via clearing house transfer) open index options positions plus cash equal to strike price plus accrued interest to the Index Participation Note-Issuer on an appropriate settlement timeline and receive one creation unit of 2006 Index Participation Notes from Index Participation Note-Issuer to cover the sale on the exchange, market, etc on settlement. The arbitrageur also receives more than enough cash proceeds from the sale of Index Participation Notes to meet its cash delivery requirements, with the excess proceeds representing arbitrage profit from the creation transaction.

Conversely, if the Index Participation Notes are trading below the value equal to the current 2006 Index call options premium minus the current Index put options premium plus the cash amount equal to the options contract strike price times a contract multiplier, an opportunity for redemption arbitrage exists. In this situation the arbitrageur buys a creation unit aggregation of Index Participation Notes at the discount price on the exchange or market or other trading venue, sells one index call option contract, and buys on index put option contract to lock in the differential in the value between the current creation unit composed of the 2006 Index call options minus the current 2006 Index put options and the value of the Index Participation Notes.

The arbitrageur requests redemption of the creation unit aggregation of just-purchased Index Participation Notes from Index Participation Note-Issuer. The arbitrageur delivers out (via clearing house transfer) a creation unit of Index Participation Notes to the Index Participation Note-Issuer and as redemption proceeds receives one long call index option plus 1 short put index option position plus cash corresponding to the strike price (after applying the index multiplier) plus accrued interest from the Index Participation Note-Issuer to cover settlement of the options trades and Index Participation Note on appropriate settlement timeline and with net excess cash representing arbitrage profit from the redemption transaction.

Creation Unit Including Long Put Index Options and Short Call Index Options Contracts (Bear IP Note)

Figure 25:
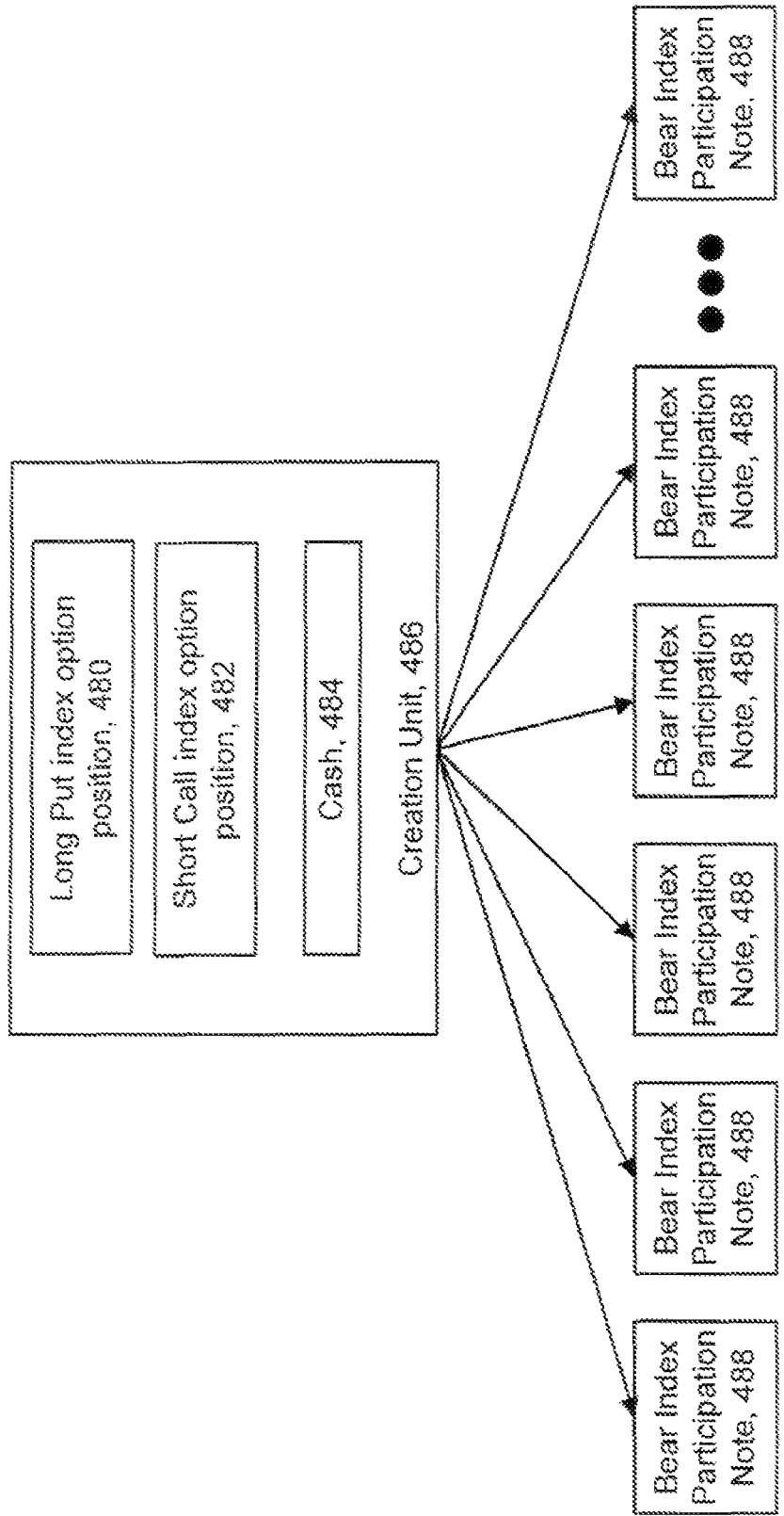
FIG. 25 is a block diagram of a creation unit and multiple Index Participation Notes.

Referring to FIG. 25, while in some of the examples described above the creation unit (e.g., creation unit 312) included long call/short put index options contracts, in some embodiments, e.g., a "bear" embodiment a creation unit 486 can include a short call index option 482 and a long put index option 480 having the same strike price and expiration date. The performance of these so called "bear" Index Participation Notes 488 based on creation unit 486 will have an inverse relationship to the performance of the index. Thus, if the index decreases, the value of the bear Index Participation Notes 488 will increase, and if the index increases the value of the bear Index Participation Notes 488 will decrease.

The creation unit 486 also includes a defined amount of cash 484. As the value of the creation unit converges to the index, on the expiration date, the Index Participation Note issuer 310 uses a computer system to administer, monitor, and reconcile cash flows depending on whether the index price is greater than, equal to, or less than the strike price. For example, if the index value is greater than the strike price on expiration date, the Index Participation Note issuer exercises the put option and the call option is not exercised. Conversely, if the index value is greater than the strike price on expiration date, the call option is exercised by its holder while the put option is not exercised. The computer system adjust the amount of cash included in the creation unit based on the exercised options and exercised settlement values.

Balanced-Asset Options Based IP Notes

In some embodiments, investment instruments other than index based options contracts can be included in a creation unit and used to generate Index Participation Notes. For example, a creation unit could blend options contracts for diversified asset exposure in pre-determined, weighted amounts between stocks, bonds, currencies, commodities and/or other assets underlying options contracts. In general, the creation unit could include any cash-settled options contract, whether involving financial options contracts or non-financial options contracts, and whether index-based or not.

Upside Participation/Downside Protection Index Participation Notes

Figure 26:
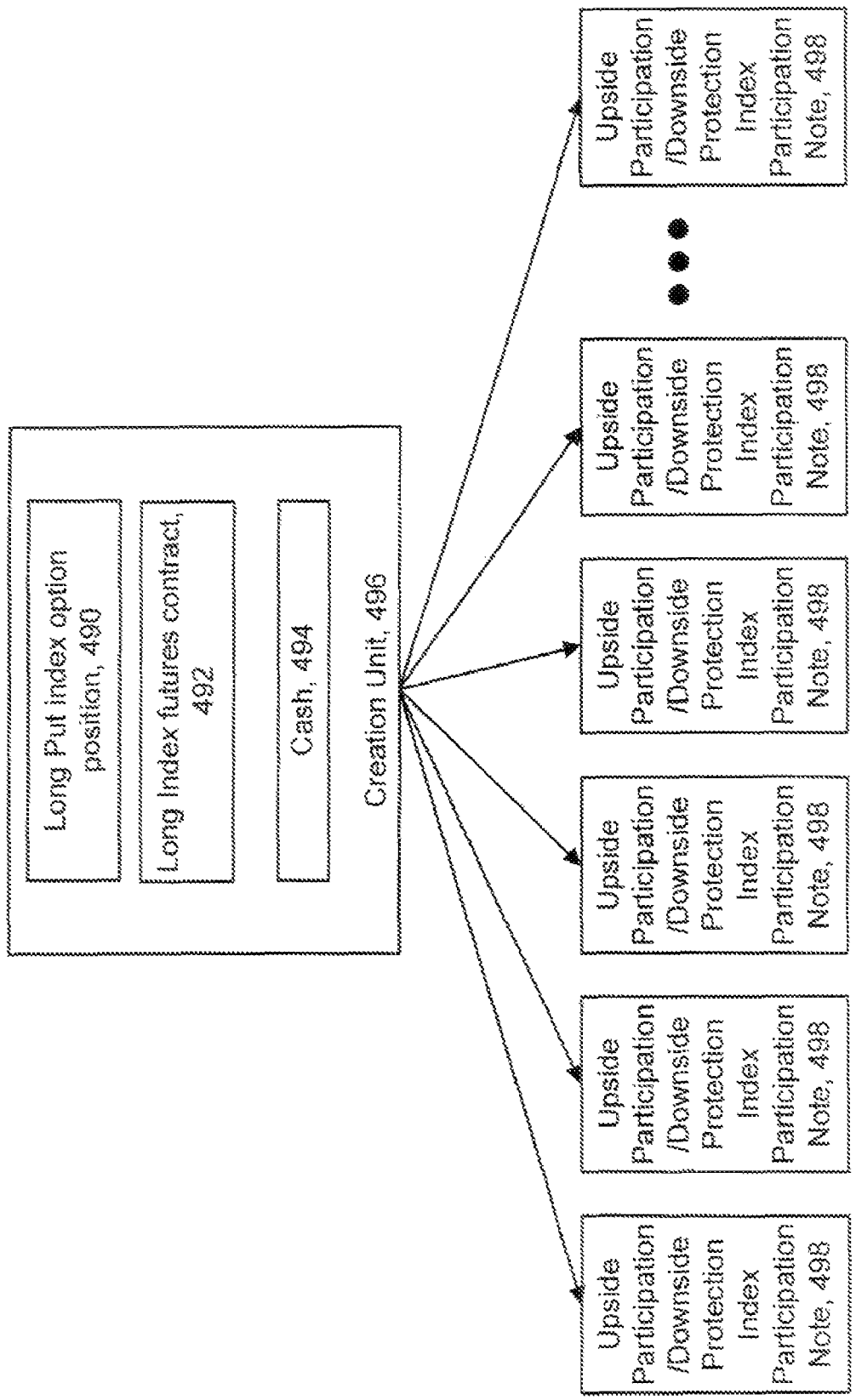
FIG. 26 is a block diagram of a creation unit and multiple Index Participation Notes.

Referring to FIG. 26, in some embodiments the Index Participation Notes are upside participation/downside protection Index Participation Notes 498 that provide gains in the index should the value of the index increase and provide protection of the initial investment should the value of the index decrease. Such upside participation/downside protection Index Participation Notes 498 are based on a creation unit 496 that could include a long put index option position 490 or long index futures option position to provide protection when the underlying index falls in value and a long index futures contract 492 to provide gains when the underlying index rises in value. The long put index option (or futures option) 490 will have a strike price corresponding to the value of the underlying stocks index below which the investor wishes to be protected against adverse price movements. The creation unit 496 also includes a defined amount of cash 494 corresponding to the mark price (and accrued interest) for the index futures contracts.

Figure 27A:
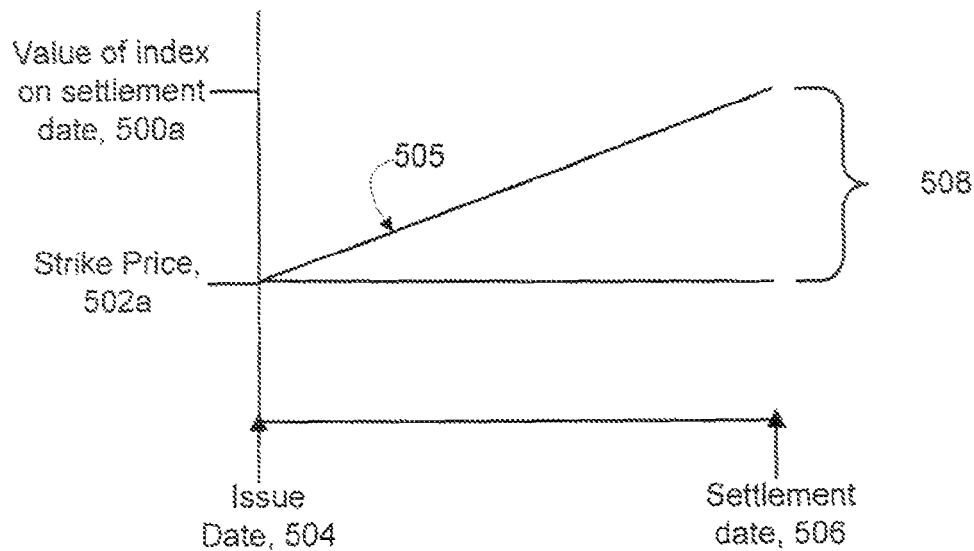
FIG. 27A is a diagram of changes in the value of an index versus time.
Figure 27B:
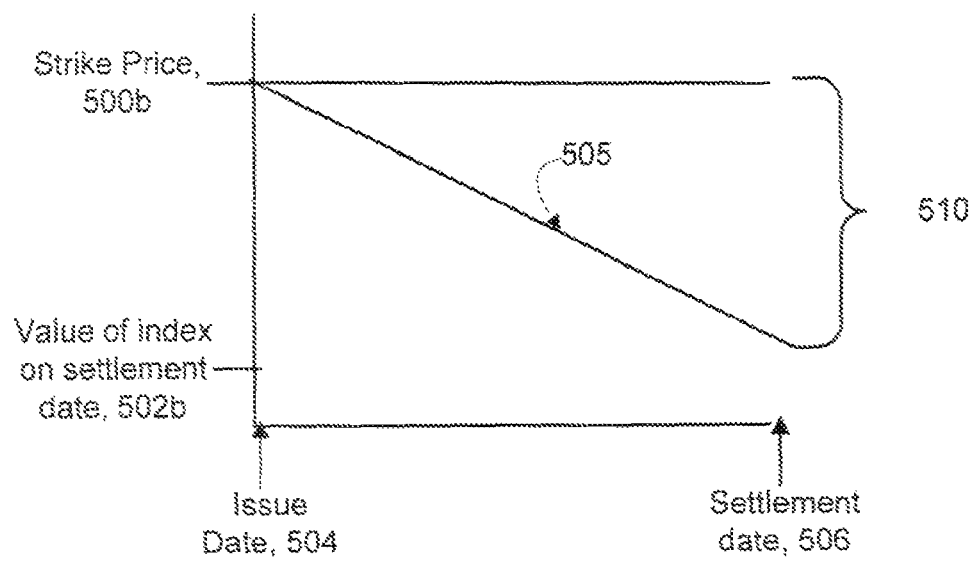
FIG. 27B is a diagram of changes in the value of an index versus time.

Referring to FIGS. 27A and 27B, examples of the value of the creation unit 496 versus the performance of the index (indicated by line 505), for upside participation/downside protection Index Participation Notes 496 based on a creation unit 496 that includes a long put index option 490 (or long put index futures option) and a long index futures contract 492 is shown. In this example, the strike price 502a for the long put index option 490 is the same as the mark price 502a for the long index futures contract 492 on the date of generation of the creation unit 496.

In the example shown in FIG. 27A, the value of the index (represented by line 505) rises between the issue date 504 and the settlement date 506. At the settlement date 506, the strike price of the options contracts 502a is less than the value of the index 500a. Thus, the put option expires worthless (i.e. has a profit of $0). However, since the mark price for the long index futures 502a is less than the value of the index 500a, a profit 408 is gained from the long index futures contract 492. Thus, the sum of the cash 494 in the creation unit 496 (e.g., the strike price plus the profit 508 from the futures contract) is equal to the value of the index 500a.

In the example shown in FIG. 27B, the value of the index (represented by line 505) falls between the issue date 504 and the settlement date 506. At the settlement date 506, the strike price 500b of the options contract is greater than the value of the index 502b. As such, the long put option 490 has a payout 510 of the strike price minus the index value. The futures contract has a loss equal to the strike price minus the index value. Thus, the sum of the profit from the long put option 490 and the loss from the long futures 492 is approximately zero and the value of the Index Participation Note on settlement date is equal to the strike price. As such, the upside participation/downside protection Index Participation Note 498 is shown to protect the investment of the note holder from the decrease in the value of the index below the strike price.

Upside Participation/Downside Protection Index Participation Notes

Figure 28:
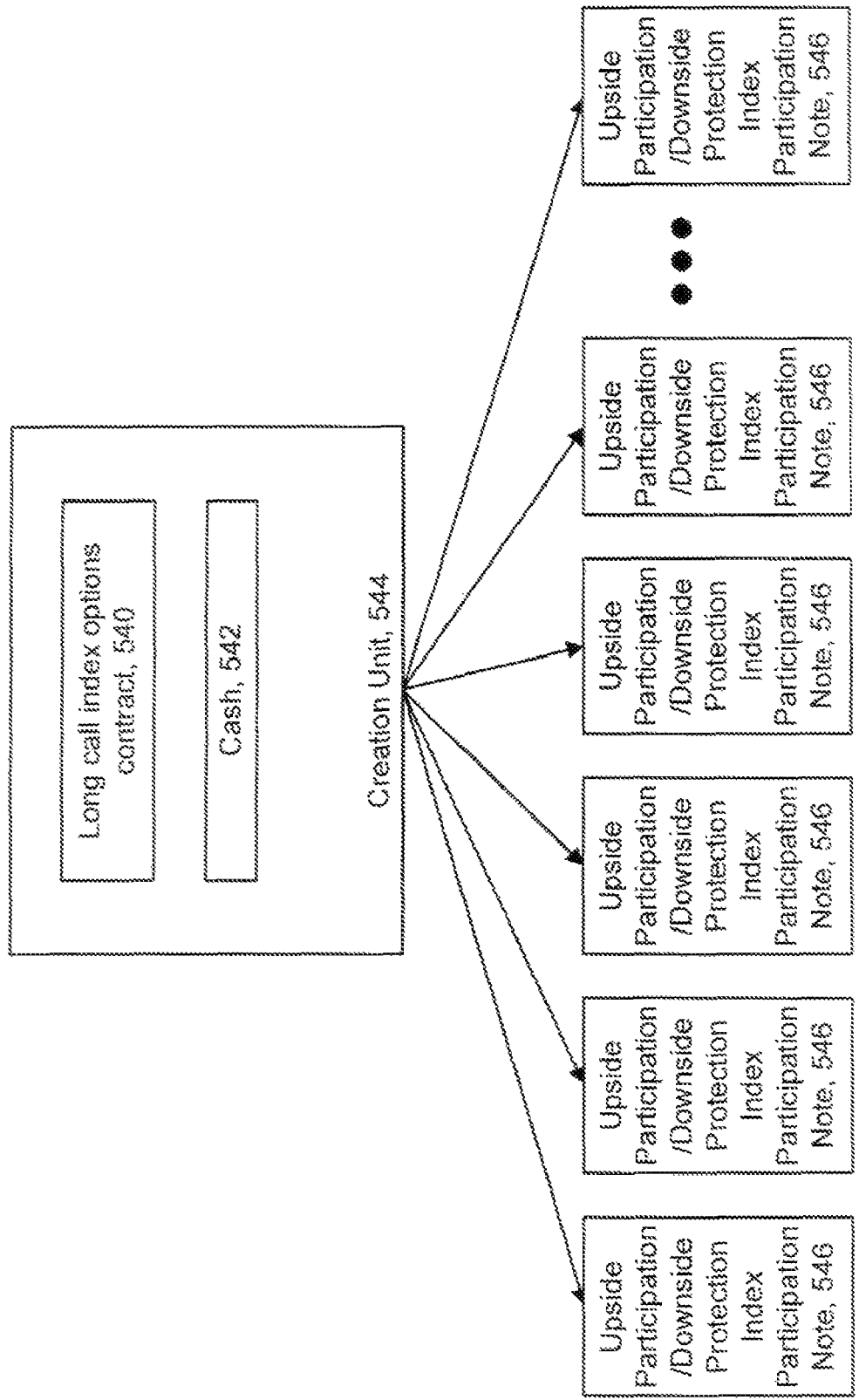
FIG. 28 is a block diagram of a creation unit and multiple Index Participation Notes.

Referring to FIG. 28, in some embodiments, Index Participation Notes 546 are based on a creation unit 544 that includes a long call index options contract 540 to provide the upside gains. The creation unit 544 also includes a defined amount of cash 542 equal to the strike price for the long call index options contract.

Figure 29A:
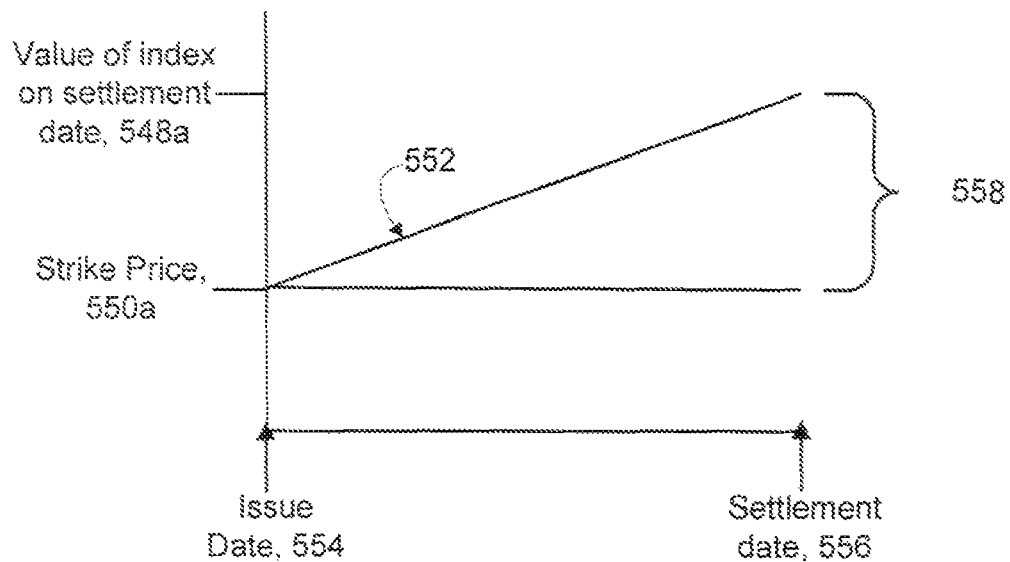
FIG. 29A is a diagram of changes in the value of an index versus time.
Figure 29B:
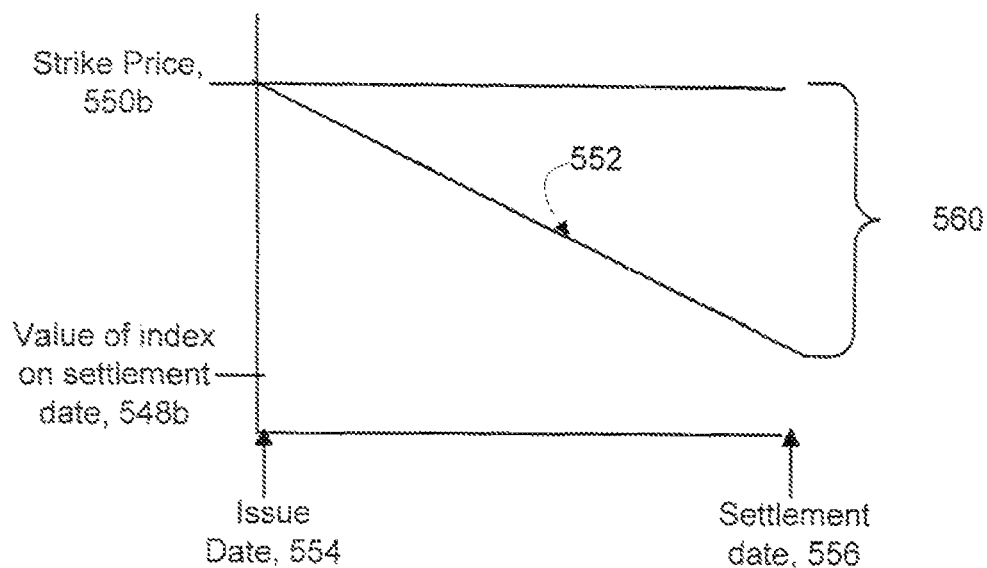
FIG. 29B is a diagram of changes in the value of an index versus time.

Referring to FIGS. 29A and 29B, examples of the value of the creation unit 544 versus the performance of the index (indicated by line 552), for upside participation Index Participation Notes 546 based on a creation unit 544 that includes a long call index option 540 (or futures option) and cash 542 is shown.

In the example shown in FIG. 29A, the value of the index (represented by line 552) rises between the issue date 554 and the settlement date 556. At the settlement date 556, the strike price of the options contracts 550a is less than the value of the index 548a. Thus, the long call index option or futures option has a payout of the difference between the index 548a and the strike price 550a (represented by arrow 558).

In the examples shown in FIG. 29B, the value of the index (represented by line 552) falls between the issue date 554 and the option expiration date 556. At the expiration date 556, the strike price 550b of the long call options contract is greater than the value of the index 502b. As such, the long call index option expires worthless. Thus, at the settlement date 556, the Index Participation Note has a value equal to the pro-rata share of the cash 542 included in creation unit 544 which corresponds to the strike price. The value of the Index Participation Note is not further reduced by the decrease in the value of the index, thereby providing downside protection.

Buy/Write Index Participation Note

Figure 30:
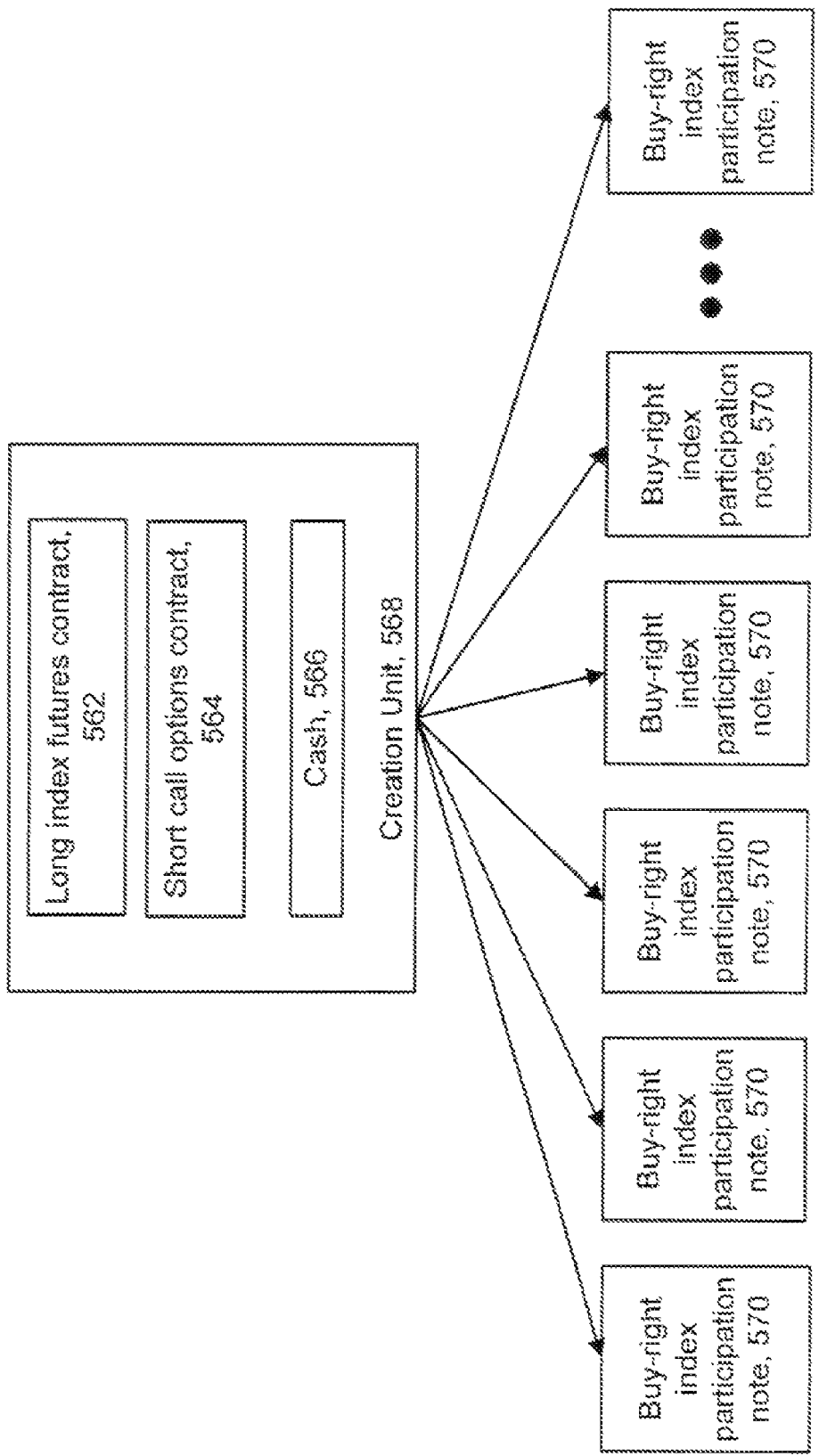
FIG. 30 is a block diagram of a creation unit and multiple Index Participation Notes.

Referring to FIG. 30, in some embodiments the Index Participation Notes are buy/write Index Participation Notes 570 that provide an economic cash benefit when the underlying index increases in value but not above the strike price from the issue date to the settlement date (e.g., when the market is 'flat'). Such buy/write Index Participation Notes 570 are based on a creation unit 568 that includes a long index futures contract 562 and an amount of cash 566 equal to the mark price for the long index futures contract 562. The combination of the long index futures contract 562 and the cash 566 provides for a return corresponding to the index return (as described above). The creation unit also includes a short call index options contract 564 or short call index futures option with same strike price. When the Index Participation Note issuer writes the short call index options contract 564, the note issuer receives the options premium or proceeds from the sale to the party that purchases the long position. Thus, an economic cash benefit is made from writing the short call index options contract 564.

Buy/write Index Participation Notes 570 provide an economic cash benefit if the index increases in value up to but not above the strike price of the options or futures options. If the index increases in value above the strike price, the gains from the long index futures contract 562 and the loss from the short call options contract 564 offset each other such that there are no gains or losses for increases in index value above the strike price. If the index decreases in value, the value of the buy/write Index Participation Notes 570 tracks the index value.

While in the example of a buy/write Index Participation Notes 570 described above, the creation unit included a long index futures contract 562 and a defined amount of cash 566, other positions equivalent in value to a long stock position could be substituted for the long index futures contract 562 and defined amount of cash 566. For example, the creation unit could include a long call index options contract, a short put index options contract with a strike price different from the strike price of the short index call option or short index call futures option, and an amount of cash equal to the strike price of the options contracts.

Distributions

As described above, the cash included in a creation unit (e.g., cash 26 in creation unit 20, cash 320 in creation unit 312) for the Index Participation Notes is invested in interest bearing investments. For example, the cash can be held in U.S. Treasury bills or notes that guarantee a fixed return over a predefined period of time. The net profit of interest gained on the cash is periodically distributed to the holders of the index participation, e.g., quarterly, semi-annually, or annually. In some embodiments, the yield on cash held in U.S. Treasury bills in Issuer's Custody Account can accrue and is distributed to Index Participation Note holders on final redemption, expiration, or settlement of the Index Participation Note in lieu of quarterly stock dividends.

Figure 31:
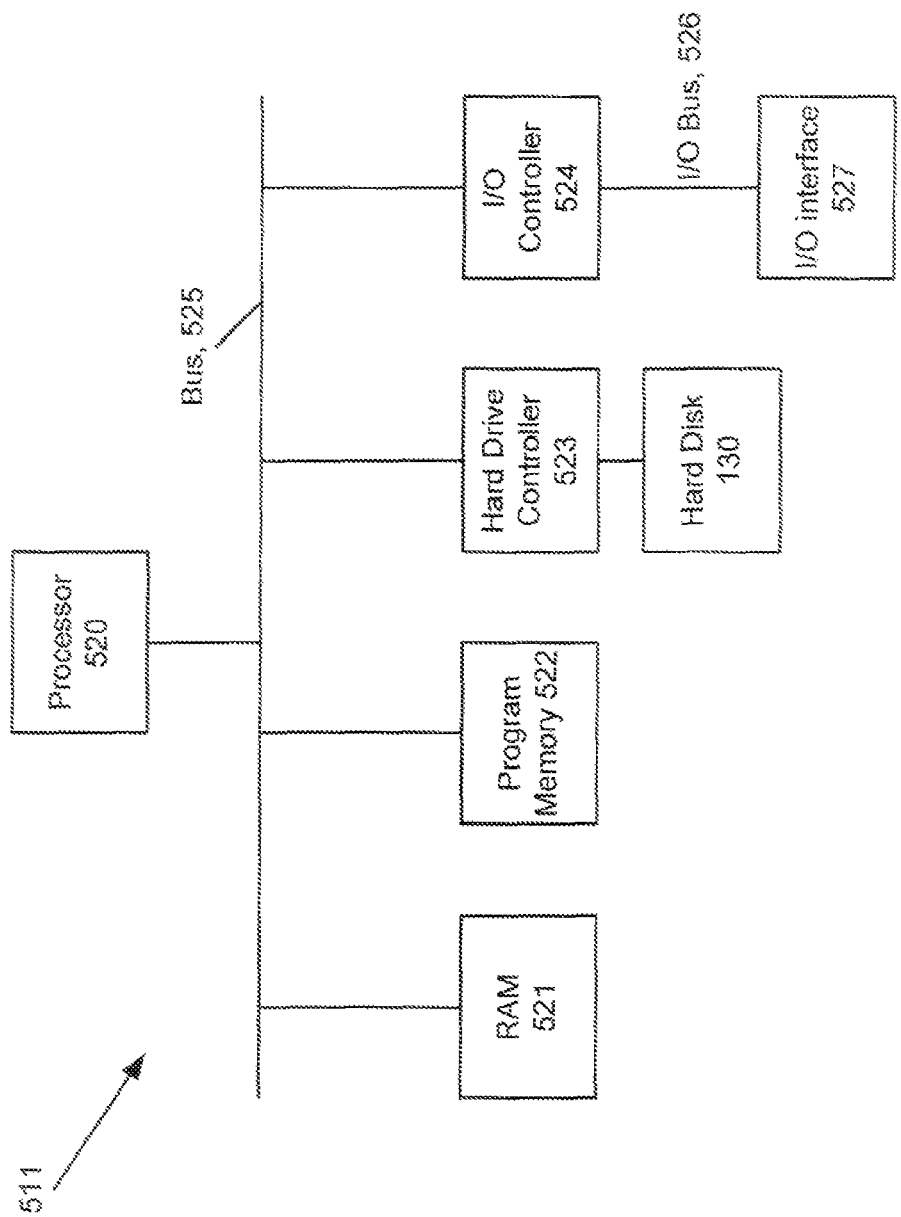
FIG. 31 is a block diagram of a computer system.

The system and methods described herein can be implemented in digital electronic circuitry, or in computer hardware, firmware, software, or in combinations thereof. For example, calculations of the cash value for a creation unit, the formation of a creation unit, the settlement processes for Index Participation Notes, etc. can occur in systems 511 as shown in FIG. 31. Generation of creation units can be implemented using any technique. Also, data structures used to represent contents of the creation units and interest participation notes can be stored in memory and in persistence storage. The Index Participation Notes can be represented by certificates or preferably as book entries in the records of an administrator or broker/dealer or clearing house or transfer agent or registrar either as manual entries or preferably as data structures in an administrator or a broker/dealer's computer systems.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired, and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

An example of one such type of computer is shown in FIG. 31, which shows a block diagram of a programmable processing system (system) 511 suitable for implementing or performing the apparatus or methods described herein. The system 511 includes a processor 520, a random access memory (RAM) 521, a program memory 522 (for example, a writeable read-only memory (ROM) such as a flash ROM), a hard drive controller 523, and an input/output (I/O) controller 524 coupled by a processor (CPU) bus 525. The system 511 can be preprogrammed, in ROM, for example, or it can be programmed (and reprogrammed) by loading a program from another source (for example, from a floppy disk, a CD-ROM, or another computer).

The hard drive controller 523 is coupled to a hard disk 130 suitable for storing executable computer programs, including programs embodying the present invention, and data including storage. The I/O controller 524 is coupled by an I/O bus 526 to an I/O interface 527. The I/O interface 527 receives and transmits data in analog or digital form over communication links such as a serial link, local area network, wireless link, and parallel link.

While embodiments have been described above in which a creation unit includes a long put index option position, in some embodiments, a long index futures option position can be substituted for the long put index option position in a creation unit.

While embodiments have been described above in which a creation unit includes a short put index option position, in some embodiments, a short put index future option position can be substituted for the short put index option position in a creation unit.

While embodiments have been described above in which a creation unit includes a long call index option position, in some embodiments, a long call index futures option position can be substituted for the long call index option position in a creation unit.

While embodiments have been described above in which a creation unit includes a short call index option position, in some embodiments, a short call index futures option position can be substituted for the short call index option position in a creation unit.

Particular embodiments have been described; however other embodiments are within the scope of the following claims.

What is claimed is:

1. A computer implemented method of trading an interest in a derivate contract on a stock exchange, stock market or an electronic communication network trading venue, the method comprising:
   receiving by one or more computers information related to trading of an Index Participation Note on a stock exchange, stock market or an electronic communication network trading venue, the Index Participation Note representing a fractional interest of a creation unit, the creation unit consisting essentially of:
   a long index futures contract; and
   an amount of cash, the amount of cash being substantially equal to a mark price of the long index futures contract at a time of formation of the creation unit and being adjustable to cause a value of the creation unit to substantially converge to a value of an index underlying the long index futures contract on an expiration date, the amount of cash being based on changes in the mark price of the long index futures contract at times subsequent to the formation of the creation unit;
   calculating by the one or more computers a total value of the cash based on an initial value of the cash that is substantially equal to the mark price of the long index futures contract and changes in the mark price of the long index futures contract.

2. The computer implemented method of claim 1, further comprising disclosing the contents of the creation unit with the creation unit consisting essentially of the long index futures contract and an initial amount of cash substantially equal to the mark price of the long index futures contract at the time of formation of the creation unit adjusted by changes in the mark price of the long index futures contract subsequent to the formation of the creation unit.

3. The computer implemented method of claim 2, wherein disclosing the contents of the creation unit comprises:
   disclosing the long index futures contracts included in the creation unit; and
   disclosing the total value of cash included in the creation unit.

4. The computer implemented method of claim 3, wherein disclosing the total value of cash included in the creation unit further comprises:
   calculating, by the one or more computers, an accrued interest on the cash; and
   adding, by the one or more computers, the accrued interest to the total value of the cash included in the creation unit.

5. The computer implemented method of claim 1, further comprising actively trading the Index Participation Note on the stock exchange, stock market or the electronic communication network trading venue.

6. A computer implemented method of trading an interest in a derivate contract on a stock exchange, stock market or an electronic communication network trading venue, the method comprising:
   listing an Index Participation Note on the stock exchange, stock market or the electronic communication network trading venue, the Index Participation Note representing a fractional share of a creation unit, the creation unit consisting essentially of:
   a long index futures contract; and
   an amount of cash, the amount of cash being substantially equal to a mark price of the long index futures contract at a time of formation of the creation unit and being adjustable to cause a value of the creation unit to substantially converge to a value of an index underlying the long index futures contract on an expiration date of the long index futures contract, the amount of cash being substantially equal to a mark price for the long index futures contract at the time of formation of the creation unit;
   receiving by one or more computers a calculated, initial price for the Index Participation Note based on a pro-rata amount of the cash and a value of the index futures contract; and subsequent to listing:
   causing by the one or more computers contents of the creation unit to be periodically published over a computer network by disclosing the long index futures contract and a total value of cash that is calculated based on an initial value of the cash that is substantially equal to the mark price of the long index futures contract and changes in the mark price of the long index futures contract; and
   trading the Index Participation Note on the stock exchange, stock market or the electronic communication network trading venue at a trading price for the Index Participation Note that varies based on supply and demand for the Index Participation Note.

7. The computer implemented method of claim 6, further comprising:
   recording, by the one or more computers, an initial mark price for the long index futures contract on the issue date of the futures contract; and
   recording, by the one or more computers, a contract multiplier for the long index futures contract.

8. The computer implemented method of claim 7, further comprising:
   calculating, by the one or more computers, the amount of cash included in the creation unit on a date subsequent to generation of the creation unit based on changes in the mark price of the long index futures contract.

9. The computer implemented method of claim 7, further comprising determining an initial amount of cash to add to the creation unit prior to registering the Index Participation Note, the initial amount of cash being based on the initial mark price of the futures contract and the contract multiplier.

10. The computer implemented method of claim 9, further comprising holding the Index Participation Notes in a brokerage account.

11. A computer implemented method of trading an interest in a derivate contract on a stock exchange, stock market or an electronic communication network trading venue the method comprising:

listing an Index Participation Note on the stock exchange, stock market or the electronic communication network trading venue, the Index Participation Note representing a fractional share of a creation unit, the creation unit consisting essentially of:

a long call index options contract and a short put index options contract with the long call index options contract and the short index put options contract having a same initial strike price and a same expiration date; and an amount of cash, the amount of cash being adjustable to cause a value of the creation unit to substantially converge to a value of an index underlying the long call index options contract and the short put index options contract on the expiration date of the long call index options contract and the short put index options contract, the amount of cash being substantially equal to the initial strike price of the long call index options contract and the short put index options contract, the amount of cash being adjustable subsequent to a time of producing the creation unit;

receiving by one or more computers a calculated, initial price for the Index Participation Note based on a pro-rata amount of the cash and values of the long call index options contract and the short put index options contract; and subsequent to listing:

causing by the one or more computers the contents of the creation unit to be periodically published over a computer network by disclosing the long call index options contract, the short put index options contract and a total value of cash; and trading the Index Participation Note on the stock exchange, stock market or the electronic communication network trading venue at a trading price for the Index Participation Note that varies based on supply and demand for the Index Participation Note.

12. The computer implemented method of claim 11, wherein the amount of cash further comprises a predefined amount of cash on a date of generation of the creation unit.

13. The computer implemented method of claim 12, further comprising determining an initial amount of cash to include in the creation unit prior to registering the Index Participation Note, the initial amount of cash being based on the initial strike price of the long call index options contract and the short put index options contract.

14. The computer implemented method of claim 12, further comprising liquidating the Index Participation Note on the expiration date of the long call and short put index options contracts.

15. A computer implemented method of trading an interest in a derivate contract on a stock exchange, stock market or an electronic communication network trading venue, the method comprising:

listing an Index Participation Note on the stock exchange, stock market or the electronic communication network trading venue, the Index Participation Note representing a fractional share of a creation unit, the creation unit consisting essentially of:

a long put index options contract and a long index futures contract with the long put index options contract and the long index futures contract each having a same initial mark price and expiration date; and an amount of cash, the amount of cash being adjustable to cause a value of the creation unit to substantially converge to a value of an index underlying the long index futures contract on an expiration date, the amount of cash being substantially equal to the initial mark price of the long put index options contract and the long index futures contract, the amount of cash being adjustable subsequent to a time of producing the creation unit;

receiving by one or more computers a calculated, initial price for the Index Participation Note based on a pro-rata amount of the cash and a value of one or both of the long put index options contract and the long index futures contract; and subsequent to listing:

causing by the one or more computers contents of the creation unit to be periodically published over a computer network by disclosing the long put index options contract, the long index futures contract and a total value of cash; and trading the Index Participation Note on the stock exchange, stock market or the electronic communication network trading venue at a trading price for the Index Participation Note.

16. The computer implemented method of claim 15, further comprising actively trading the Index Participation Note on the stock exchange, stock market or the electronic communication network trading venue based on the supply and demand for the Index Participation Note.

* * * * *

UNITED STATES PATENT AND TRADEMARK OFFICE
CERTIFICATE OF CORRECTION

PATENT NO.        : 7,827,094 B2
APPLICATION NO.   : 11/553549
DATED             : November 2, 2010
INVENTOR(S)       : Steven M. Bloom Page 1 of 1

It is certified that error appears in the above-identified patent and that said Letters Patent is hereby corrected as shown below:

Claim 1, Line 29 – delete "derivate" and insert -- derivative --, therefore.

Claim 6, Line 13 – delete "derivate" and insert -- derivative --, therefore.

Claim 11, Line 5 – delete "derivate" and insert -- derivative --, therefore.

Claim 15, Line 9 – delete "derivate" and insert -- derivative --, therefore.

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,827,094 B2
APPLICATION NO. : 11/553549
DATED : November 2, 2010
INVENTOR(S) : Steven M. Bloom It is certified that error appears in the above-identified patent and that said Letters Patent is hereby corrected as shown below:

Claim 1, Column 29, Line 29 – delete "derivate" and insert -- derivative --, therefore.

Claim 6, Column 30, Line 13 – delete "derivate" and insert -- derivative --, therefore.

Claim 11, Column 31, Line 5 – delete "derivate" and insert -- derivative --, therefore.

Claim 15, Column 32, Line 9 – delete "derivate" and insert -- derivative --, therefore.

This certificate supersedes The Certificate of Correction issued February 1, 2011.

Signed and Sealed this
First Day of March, 2011

David J. Kappos
*Director of the United States Patent and Trademark Office*